US012783246B2

(12) United States Patent
Usui et al.

(10) Patent No.: US 12,783,246 B2
(45) **Date of Patent: *Nov. 3, 2026**

(54) ANALYSIS FUNCTION IMPARTING METHOD, ANALYSIS FUNCTION IMPARTING DEVICE, AND ANALYSIS FUNCTION IMPARTING PROGRAM

(71) Applicant: NTT, Inc., Tokyo (JP)

(72) Inventors: Toshinori Usui, Musashino (JP); Tomonori Ikuse, Musashino (JP); Yuhei Kawakoya, Musashino (JP); Makoto Iwamura, Musashino (JP)

(73) Assignee: NTT, Inc., Tokyo (JP)

(*) Notice: Subject to any disclaimer, the term of this patent is extended or adjusted under 35 U.S.C. 154(b) by 213 days.

This patent is subject to a terminal disclaimer.

(21) Appl. No.: 18/701,934

(22) PCT Filed: Oct. 18, 2021

(86) PCT No.: PCT/JP2021/038499

§ 371 (c)(1),
(2) Date: Apr. 17, 2024

(87) PCT Pub. No.: WO2023/067665

PCT Pub. Date: Apr. 27, 2023

(65) Prior Publication Data

US 2025/0224961 A1 Jul. 10, 2025

(51) Int. Cl.

*G06F 21/00* (2013.01)
*G06F 9/38* (2018.01)

(52) U.S. Cl.

CPC .................................. *G06F 9/3861* (2013.01)

(58) Field of Classification Search

None
See application file for complete search history.

(56) References Cited

U.S. PATENT DOCUMENTS 7,694,110 B1 * 4/2010 Alsup .................. G06F 9/3861 712/245
7,747,989 B1 * 6/2010 Kissell .................... G06F 9/455 717/148

(Continued)

OTHER PUBLICATIONS

Arnold, Matthew et al. A Survey of Adaptive Optimization in Virtual Machines. Proceedings of the IEEE, vol. 93, Issue: 2. https://ieeexplore.ieee.org/stamp/stamp.jsp?tp=&arnumber=1386662 (Year: 2005).*

(Continued)

*Primary Examiner* — Jeremiah L Avery
(74) *Attorney, Agent, or Firm* — XSENSUS LLP

(57) ABSTRACT

An analysis function providing method executed by an analysis function providing device includes first analyzing a virtual machine of a script engine, and acquiring a hook point that is a part where an analysis code is inserted by applying a hook, and a virtual program counter that is a variable indicating an instruction of the virtual machine to be executed next, second analyzing an instruction set architecture that is a system of instructions of the virtual machine and detecting an offset value of the virtual program counter, and providing an analysis function by applying a hook, to the hook point of the script engine, the hook including processing of setting a value of a next virtual program counter to a value obtained by adding the offset value of the virtual program counter to a value of an immediately preceding virtual program counter when an exception has occurred.

17 Claims, 26 Drawing Sheets

(56) References Cited

U.S. PATENT DOCUMENTS

| | | | | |
|---|---|---|---|---|
| 7,966,480 | B2 * | 6/2011 | Catherwood | G06F 9/3861 712/208 |
| 2017/0161077 | A1 * | 6/2017 | Altevogt | G06F 9/3838 |
| 2026/0042202 | A1 * | 2/2026 | Cristache | B25J 9/161 |

OTHER PUBLICATIONS

Smith, Todd et al. Experiences with retargeting the Java HotSpot virtual machine. Proceedings 16th International Parallel and Distributed Processing Symposium. https://ieeexplore.ieee.org/stamp/stamp.jsp?tp=&arnumber=1016507 (Year: 2002).*

Duncan, Ralph et al. Mapping Exceptions to High-Level Source Code on a Heterogeneous Architecture. 2018 9th International Symposium on Parallel Architectures, Algorithms and Programming (PAAP). https://ieeexplore.ieee.org/stamp/stamp.jsp?tp=&arnumber=8701754 (Year: 2018).*

Saxena et al., "A Symbolic Execution Framework for JavaScript", 2010 IEEE Symposium on Security and Privacy, May 16-19, 2010, pp. 513-528.

Kim et al., "J-Force: Forced Execution on JavaScript", 2017 International World Wide Web Conference Committee (IW3C2), Apr. 3-7, 2017, pp. 897-906.

Bucur et al., "Prototyping Symbolic Execution Engines for Interpreted Languages", School of Computer and Communication Sciences, Feb. 24, 2014, 108 pages.

Sharif et al., "Automatic Reverse Engineering of Malware Emulators", 2009 30th IEEE Symposium on Security and Privacy, May 17-20, 2009, pp. 94-109.

Usui et al., "Automatically Appending Multi-Path Execution Functionality to Vanilla Script Engines", CSS 2019 Conference, 8 pages including English Abstract.

Kolbitsch et al., "The Power of Procrastination: Detection and Mitigation of Execution-Stalling Malicious Code", CSS'11, Oct. 17-21, 2011, pp. 285-296.

* cited by examiner

Fig. 4

```
a = 0
For N = 0 To 10
   a = a + N
   a = a * N
   a = a - N
Next
```

Fig. 5

```
...
trace: branch, type: jmp, src: 0x6d375f2e, dst: 0x6d39022f
trace: branch, type: jmp, src: 0x6d375f36, dst: 0x6d39023b
trace: branch, type: jmp, src: 0x6d361c86, dst: 0x6d39aee0
trace: branch, type: ret, src: 0x6d361c8c, dst: 0x6d375f4c
trace: branch, type: ret, src: 0x6d375f4f, dst: 0x6d375ee1
trace: branch, type: jmp, src: 0x6d375ee3, dst: 0x6d38fb18
trace: branch, type: ret, src: 0x6d38fb1c, dst: 0x6d375cc9
trace: branch, type: jmp, src: 0x6d375ccb, dst: 0x6d39500a
trace: branch, type: jmp, src: 0x6d375cd6, dst: 0x6d39508a
trace: branch, type: call, src: 0x6d375ceb, dst: 0x75e45435
trace: memaccess, type: read, target: 0x7fff0268, value: 0x0
trace: memaccess, type: write, target: 0x7fffc520, value: 0x55553268
trace: memaccess, type: read, target: 0x55554048, value: 0x31
...
```

Fig. 6

```
...
vpc: 0x555c7e40, vmop: 0x32
vpc: 0x555c7e44, vmop: 0x52
vpc: 0x555c7e48, vmop: 0x1f
vpc: 0x555c82a0, vmop: 0x08
vpc: 0x555c82a4, vmop: 0x32
vpc: 0x555c82a8, vmop: 0x06
...
vpc: 0x555c832c, vmop: 0x21
vpc: 0x555c7514, vmop: 0x2a
vpc: 0x555c7518, vmop: 0x06
...
```

Fig. 26

```
Set wmi = GetObject("winmgmts:¥¥.¥root¥cimv2")
Set cpu = wmi.ExecQuery("Select * from Win32_Processor")

If cpu.Item("Win32_Processor.DeviceID='CPU0'").NumberOfCores <= 2 Then
    WScript.Quit
End If
do_malicious()
```

ANALYSIS FUNCTION IMPARTING METHOD, ANALYSIS FUNCTION IMPARTING DEVICE, AND ANALYSIS FUNCTION IMPARTING PROGRAM

CROSS-REFERENCE TO RELATED APPLICATION

The present application is based on PCT filing PCT/JP2021/038499, filed Oct. 18, 2021, the contents of which are incorporated herein by reference in their entirety.

TECHNICAL FIELD

The present invention relates to an analysis function providing method, an analysis function providing device, and an analysis function providing program.

BACKGROUND ART

As various forms of attack such as spam (malspam) using malware and fileless malware occur, a threat of attack by a script (malicious script) exhibiting malicious behavior becomes apparent.

The malicious script is a script having malicious behavior, and is a program that implements an attack by abusing a function provided by a script engine. In general, an attack is performed using a script engine of a specific application such as a script engine included in an operating system (OS) by default or a viewer of a web browser or a document file.

Although many of these script engines may require user permission, behavior via a system, such as file manipulation, network communication, and process activation, is also feasible. Thus, the attack using the malicious script becomes a threat to the user, similarly to the attack using malware of an execution file.

To take measures against the attack by the malicious script, it is necessary to accurately grasp the behavior of the script. Thus, a technique of analyzing the script to clarify its behavior is desired.

A problem that arises when analyzing malicious scripts is code obfuscation. Many malicious scripts have been subjected to processing of interfering with analysis called obfuscation. Obfuscation intentionally increases complexity of a code, thereby making it difficult to analyze based on superficial information of the code. That is, it interferes with an analysis method called static analysis, which performs analysis with information obtained from the code without executing the script.

In particular, in a case where a part of the code to be executed is dynamically acquired from the outside, the code cannot be obtained without execution, so that the code cannot be statically analyzed. Thus, static analysis is impossible in principle.

On the other hand, a method called dynamic analysis in which a script is executed and its behavior is monitored and thus the behavior is known is not affected by obfuscation as described above. For this reason, in the analysis of the malicious script, a method based on dynamic analysis is mainly used.

In general dynamic analysis, a malicious script is executed in an analysis environment and its behavior is monitored, whereby only behavior of a single execution path executed in the malicious script is obtained. For this reason, there is a problem that behavior of a path that has not been executed in the analysis environment cannot be obtained.

In other words, for a malicious script having a path that is executed only under a specific condition, there is a problem that all behavior cannot be analyzed even by dynamic analysis.

As a case where there is a path that is executed only under a specific condition, for example, there are a case where a subsequent execution path is determined by a command from a command server, and a case where malicious behavior is not exhibited in the analysis environment due to analysis interference.

The former case is a case where the subsequent execution path is not determined if there is no command from the command server and a path having the malicious behavior is not executed. In a case where a malicious script is detected and analyzed, there are many cases where an attacker has already withdrawn and there is no command server, so that the malicious behavior cannot be observed in such a case.

The latter is an analysis interference that a malicious script acquires information about an environment in which the malicious script is being executed and does not exhibit the malicious behavior if the information does not meet the specific condition. For example, in a case where a feature frequently seen in the analysis environment is observed, it is determined that the malicious script is being analyzed, and the feature is used for analysis interference in which execution is interrupted.

FIG. 26 is a diagram illustrating a code piece indicating an example of analysis interference. This code piece has analysis interference in which the number of cores of a central processing unit (CPU) in an environment in which the code piece is being executed is acquired, and if the number of cores is not two or more and eight or less, it is determined that a possibility of the analysis environment is high, and the execution is ended. Otherwise, it is determined that it is not the analysis environment, and malicious behavior is exhibited.

To capture behavior of a path that is executed only under such a specific condition, multipath execution for executing a plurality of execution paths is required.

In the multipath execution, when the execution reaches a conditional branch, an execution state is caused to branch to cause each branching execution state to follow a corresponding execution path of the branch. As a result, both of two execution paths that occur in the conditional branch are executed.

Regarding implementation of multipath execution, for example, Non Patent Literature 1 describes a method of implementing symbolic execution, which is a type of multipath execution, for JavaScript (registered trademark). According to this method, in a conditional branch of a JavaScript script, it is possible to comprehensively follow executable paths and observe behavior.

In addition, Non Patent Literature 2 describes a method of implementing path forcible execution, which is a type of multipath execution, for JavaScript. According to this method, in a conditional branch of a JavaScript script, it is possible to comprehensively follow all paths and observe behavior.

Non Patent Literature 3 describes a method of manually modifying a script engine in advance and then executing the script engine on a binary symbolic execution base to implement symbolic execution through the script engine for a script executed on the script engine. According to this method, if there is a script engine that can be manually modified, it is possible to implement the symbolic execution in any script language in a general-purpose manner, and comprehensively follow executable paths and observe behavior.

Then, Non Patent Literature 4 describes a method of analyzing a virtual machine (VM) often used by malware for obfuscation of a program of the malware. According to this method, the VM is analyzed, whereby information on architecture of the VM can be acquired. Since the VM controls execution of the script in the script engine, the idea of this method can be partially diverted.

In Non Patent Literature 5, a script engine is analyzed, and a code that implements a multipath execution function is added on the basis of obtained information on the architecture, whereby multipath execution of a script is enabled. According to this method, multipath execution can be implemented for various script languages and engines.

CITATION LIST

Non Patent Literature

Non Patent Literature 1: Prateek Saxena, et al, “A Symbolic Execution Framework for JavaScript”, 2010 IEEE Symposium on Security and Privacy.

Non Patent Literature 2: Kyungtae Kim, et al, “J-Force: Forced Execution on JavaScript”.

Non Patent Literature 3: Stefan Bucur, et al, “Prototyping Symbolic Execution Engines for Interpreted Languages”.

Non Patent Literature 4: Monirul Sharif, et al, “Automatic Reverse Engineering of Malware Emulators”, 2009 30th IEEE Symposium on Security and Privacy.

Non Patent Literature 5: Toshinori Usui, Kazuki Furukawa, Yuto Otsuki, Tomonori Ikuse, Yuhei Kawakoya, Makoto Iwamura, Jun Miyoshi, Kanta Matsuura, “Automatically Appending Multi-Path Execution Functionality to Vanilla Script Engines”, 2019 Computer Security Symposium (CSS2019), pp. 961-968, 2019.

SUMMARY OF INVENTION

Technical Problem

Here, when the attacker intentionally makes an exception, the execution of the analysis may be stopped to interfere with the analysis. In addition, in the multipath execution by the path forcible execution, by forcing the execution path, an exception that cannot occur in normal execution may occur, and the execution may be stopped. Since the execution of the analysis is stopped when the exception occurs, there is a demand for a technique capable of continuing the execution of the analysis even when the exception occurs.

For this purpose, when an exception occurs, it is necessary to forcibly skip a part that causes the exception and continue execution. At this time, how much range should be skipped, for example, whether the instruction currently being executed should be skipped, whether the basic block should be skipped, or whether the function should be skipped depends on the exception that has occurred.

Thus, as one of techniques for suppressing the stop of the execution due to the exception, a technique for skipping the instruction that has caused the exception and continuing the execution is required.

The present invention has been made in view of the above, and an object is to provide an analysis function providing method, an analysis function providing device, and an analysis function providing program capable of providing a script engine with an execution function that suppresses stop of execution due to an exception by skipping an instruction that has caused the exception.

Solution to Problem

In order to solve the above-described problem and achieve the object, an analysis function providing method is an analysis function providing method executed by an analysis function providing device, the analysis function providing method including: first analyzing a virtual machine of a script engine, and acquiring a hook point that is a part where an analysis code is inserted by applying a hook, and a virtual program counter that is a variable indicating an instruction of the virtual machine to be executed next; second analyzing an instruction set architecture that is a system of instructions of the virtual machine and detecting an offset value of the virtual program counter; and providing an analysis function by applying a hook, to the hook point of the script engine, the hook including processing of setting a value of a next virtual program counter to a value obtained by adding the offset value of the virtual program counter to a value of an immediately preceding virtual program counter when an exception has occurred based on the virtual program counter and the offset value of the virtual program counter that are architecture information obtained by analysis.

Advantageous Effects of Invention

According to the present invention, it is possible to provide the script engine with the execution function that suppresses the stop of the execution due to the exception.

BRIEF DESCRIPTION OF DRAWINGS

FIG. 4 is a diagram illustrating an example of a test script used for virtual program counter (VPC) detection.

FIG. 5 is a diagram illustrating an example of an execution trace.

FIG. 6 is a diagram illustrating an example of a VM execution trace.

FIG. 26 is a diagram illustrating a code piece indicating an example of analysis interference.

DESCRIPTION OF EMBODIMENTS

Hereinafter, an embodiment of an analysis function providing method, an analysis function providing device, and an analysis function providing program according to the present application will be described in detail on the basis of the drawings. In addition, the present invention is not limited to the embodiment described below.

Embodiment

The analysis function providing device according to the embodiment is an analysis function providing device applicable to a script engine.

The analysis function providing device according to the present embodiment executes a test script while monitoring the binary of the script engine to acquire a branch trace and a memory access trace as an execution trace.

Then, the analysis function providing device analyzes a virtual machine on the basis of the execution trace, and acquires architecture information of a hook point, a tap point, a virtual program counter (VPC), which is a variable indicating a VM instruction to be executed next, a boundary of the VM instruction, and a dispatcher. Note that these are all components of the script engine, are pieces of information regarding architecture, and stored in an architecture information DB 132 (described below).

Further, the analysis function providing device executes the test script to acquire the VM execution trace, and detects an offset value of the VPC by using the VM execution trace. As a result, the analysis function providing device acquires the offset value of the VPC as the architecture information.

Then, the analysis function providing device inserts a hook using a hook handler to the hook point of the script engine on the basis of the acquired architecture information. Further, the analysis function providing device inserts an exception handler into a script to be analyzed and provides an exception handling function. The exception handler has a function of forcibly transferring processing to a VM area when the occurrence of the exception is caught. Then, a function of skipping the basic block in which the exception has occurred by setting the value of the next VPC to a value obtained by adding the VPC offset value to the value of the immediately preceding VPC is added to the hook handler. As a result, the analysis function providing device shifts the processing to the VM area when the exception occurs, and skips the basic block in which the exception has occurred as instructed by the hook handler, thereby suppressing the stop of the execution due to the exception.

Figure 1:
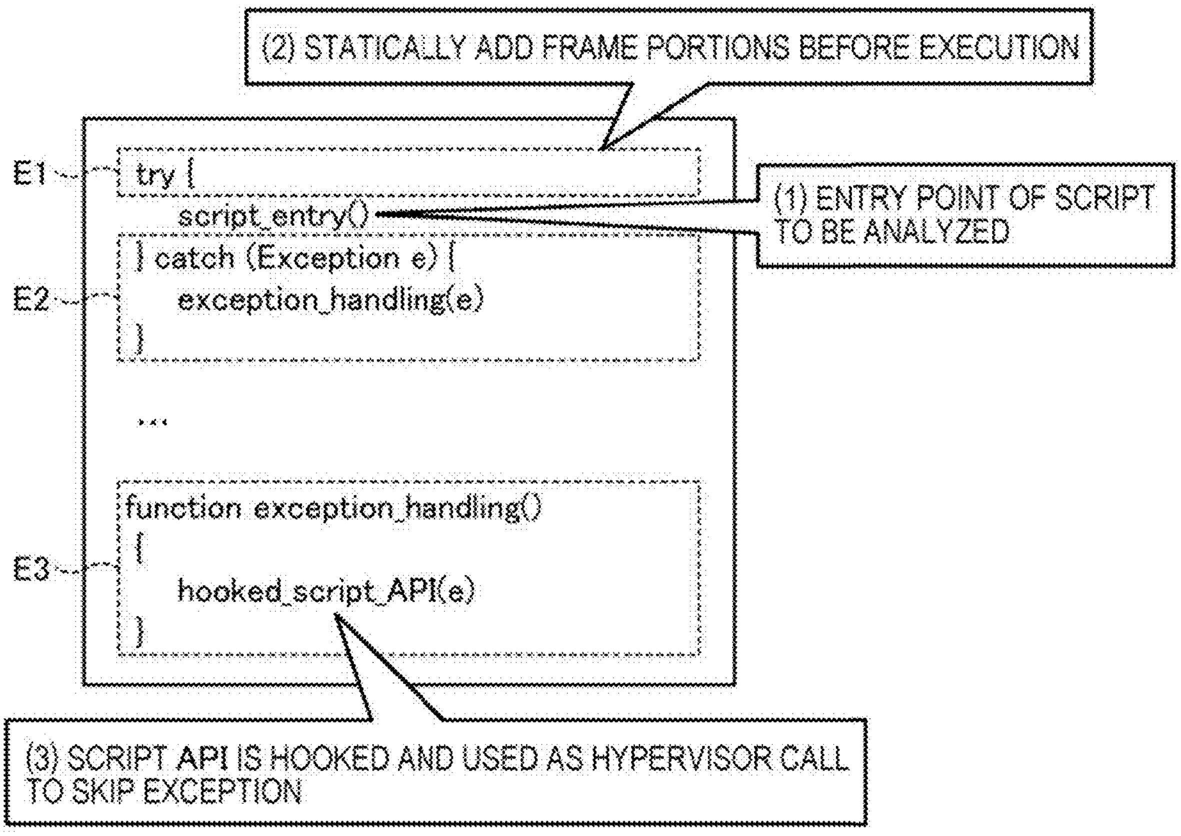
FIG. 1 is a diagram describing an example of an exception handler.
Figure 2:
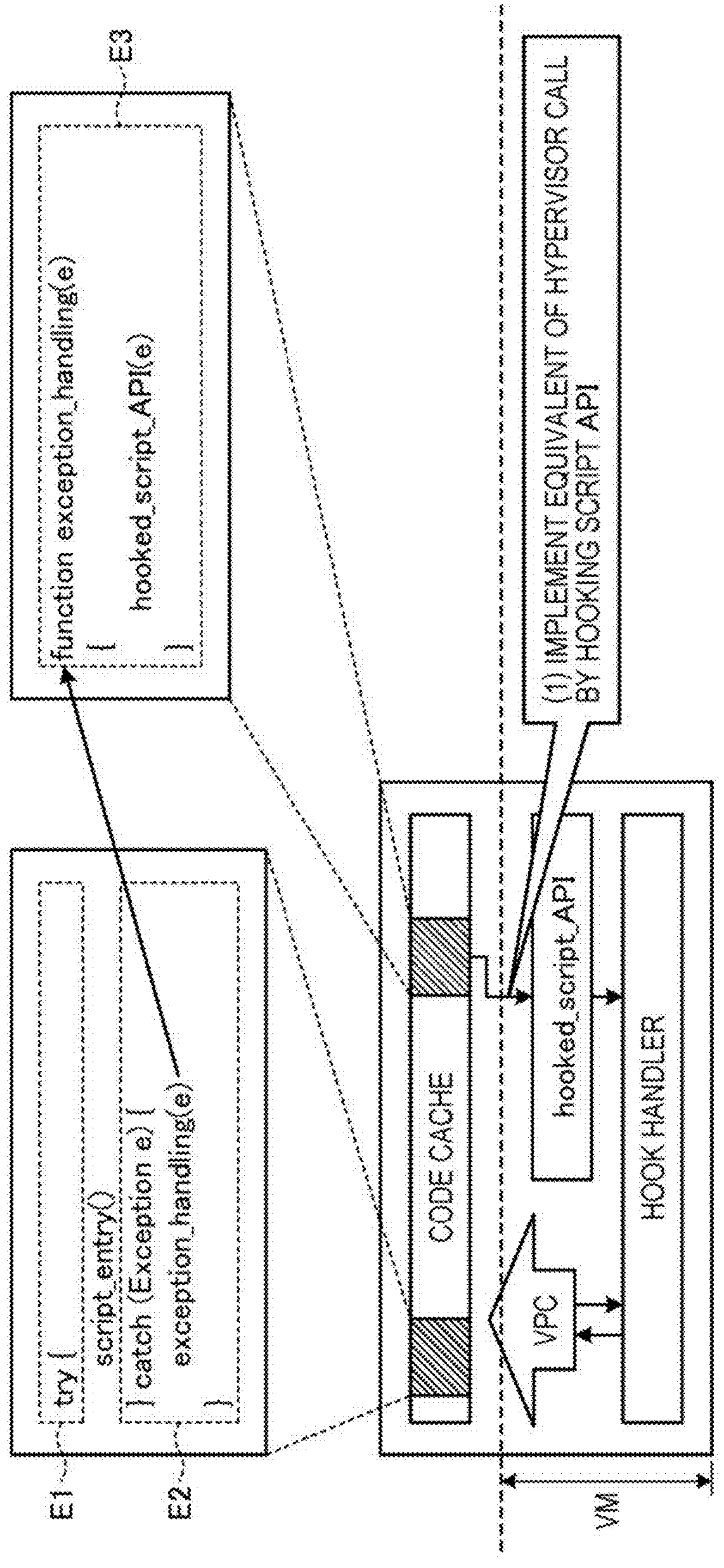
FIG. 2 is a diagram illustrating an example of a hypervisor call using a hook of a script API.

FIG. 1 is a diagram describing an example of an exception handler. FIG. 2 is a diagram illustrating an example of a hypervisor call using a hook of a script API. As illustrated in FIG. 1, the analysis function providing device statically adds the contents of frame portions E1 to E3 to an entry point of the script to be analyzed before execution ((1) and (2) in FIG. 1).

Specifically, as illustrated in FIG. 1, the analysis function providing device adds codes “try” and “catch” to the entry point of the script to be analyzed (frames E1 and E2), and adds a code “hooked script_API(e)” that hooks the script API in a case where an exception occurs as in the third line of the frame E3. As a result, at the time of exception, the script API is hooked and used as a hypervisor call to skip the exception ((3) in FIG. 1). That is, as illustrated in FIG. 2, the analysis function providing device implements an equivalent of the hypervisor call by the hook of the script API ((1) in FIG. 2), and thus shifts the processing to the VM area when the exception occurs and skips the basic block in which the exception has occurred as instructed by the hook handler.

As described above, the analysis function providing device catches the exception and inserts the exception handler into the script to be analyzed to forcibly advance the execution to a part ahead of the part where the exception has occurred, thereby continuing the analysis while preventing the unintended stop of the execution.

[Configuration of Analysis Function Providing Device]

Figure 3:
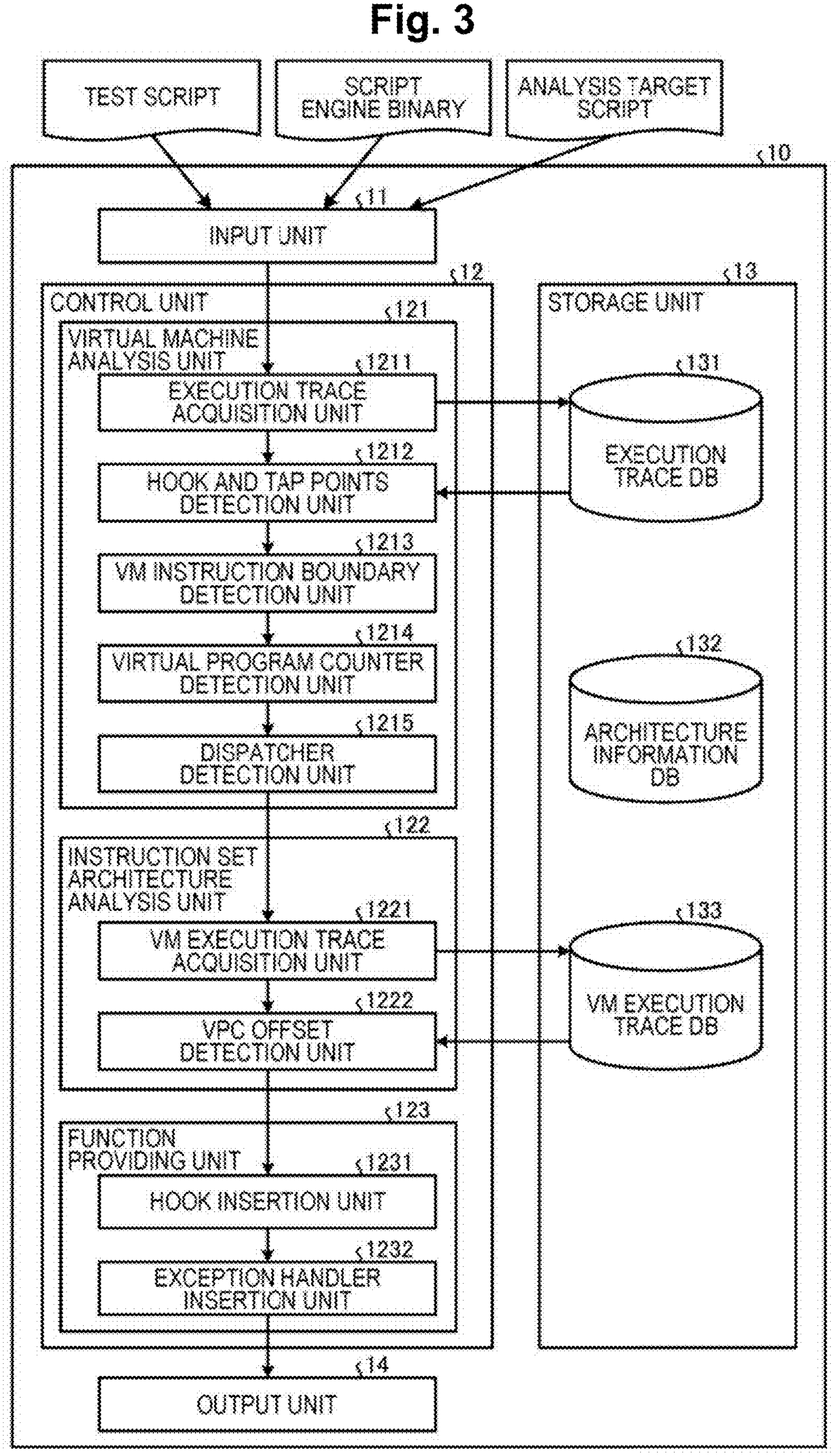
FIG. 3 is a diagram describing an example of a configuration of an analysis function providing device according to an embodiment.

Next, a configuration of an analysis function providing device 10 according to the embodiment will be specifically described with reference to FIG. 3. FIG. 3 is a diagram describing an example of a configuration of an analysis function providing device according to an embodiment.

As illustrated in FIG. 3, the analysis function providing device 10 includes an input unit 11, a control unit 12, a storage unit 13, and an output unit 14. Then, the analysis function providing device 10 receives inputs of a test script, a script engine binary, and an analysis target script.

The input unit 11 includes an input device such as a keyboard or a mouse, receives input of information from the outside, and inputs the information to the control unit 12. In addition, the input unit 11 includes a communication interface that transmits and receives various types of information to and from another device connected via a wired connection, a network, or the like, and receives an input of information transmitted from the other device. The input unit 11 receives inputs of the test script and the script engine binary, and outputs the test script and the script engine binary to the control unit 12. The test script is a script input when the script engine is dynamically analyzed and the execution trace and the VM execution trace are acquired. Note that details of the test script will be described below. The script engine binary is an executable file constituting the script engine. The script engine binary may include a plurality of executable files. The analysis target script is a script to be analyzed.

The control unit 12 includes internal memory for storing a program defining various processing procedures and the like and required data, and executes various types of processing by using the program and data. For example, the control unit 12 is an electronic circuit such as a central processing unit (CPU) or a micro processing unit (MPU). The control unit 12 includes a virtual machine analysis unit 121 (first analysis unit), an instruction set architecture analysis unit 122 (second analysis unit), and a function providing unit 123 (providing unit).

The virtual machine analysis unit 121 analyzes the VM of the script engine. The virtual machine analysis unit 121 acquires a plurality of execution traces by changing conditions at the time of execution, analyzes the plurality of execution traces by using differential execution analysis, and acquires a hook point, a tap point, and a VPC. In addition, the virtual machine analysis unit 121 analyzes the script engine binary to acquire the VM instruction boundary and the dispatcher. The virtual machine analysis unit 121 includes an execution trace acquisition unit 1211, a hook and tap points detection unit 1212, a VM instruction boundary detection unit 1213, a virtual program counter detection unit 1214, and a dispatcher detection unit 1215.

The execution trace acquisition unit 1211 receives the test script and the script engine binary as inputs. The execution trace acquisition unit 1211 acquires the execution trace by executing the test script while monitoring execution of the script engine binary.

The execution trace includes a branch trace and a memory access trace. The branch trace records a type of the branch instruction at the time of execution, a branch source address, and a branch destination address. The memory access trace records a type of memory operation and a memory address of an operation target. It is known that branch traces and memory access traces can be acquired by instruction hooks. The execution trace acquired by the execution trace acquisition unit 1211 is stored in an execution trace DB 131.

The hook and tap points detection unit 1212 analyzes the virtual machine on the basis of the execution trace acquired by the execution trace acquisition unit 1211, and detects a hook point and a tap point. Here, the hook point is a part where the hook is applied and an analysis code is inserted. In the embodiment, a function (referred to as an internal function) of the internal implementation of the script engine is used as a unit, and the hook is applied to the head of the internal function. In addition, the tap point is a memory monitoring part for outputting a log using an analysis code, and is assumed to be any of arguments of the internal function.

The hook and tap points detection unit 1212 extracts and analyzes the execution trace stored in the execution trace DB 131, and finds a possibility of the hook point. The hook and tap points detection unit 1212 searches the execution trace for a call of a system API related to the analysis target, and detects a hook point possibility by back trace from the system API. The hook and tap points detection unit 1212 detects a hook point by applying back trace from the system API corresponding to a language element to be analyzed (for example, script API).

The hook and tap points detection unit 1212 extracts a difference between a plurality of execution traces having different acquisition conditions, and detects a hook point possibility by finding a portion satisfying a specific condition. The hook and tap points detection unit 1212 detects a hook point on the basis of a difference seen between execution traces in which a plurality of conditions is changed. At this time, the hook and tap points detection unit 1212 detects the hook point using an algorithm (for example, the Smith-Waterman algorithm) that detects that a highly homologous series appears a specific number of times.

The hook and tap points detection unit 1212 applies the hook to the obtained hook point possibility and searches the memory of an argument of the function to which the hook has been applied to detect a tap point. The hook and tap points detection unit 1212 detects a tap point, which is a memory monitoring part for outputting a log using an analysis code, on the basis of the monitoring at the hook point. In addition, the hook and tap points detection unit 1212 determines a hook point possibility having a tap point as a hook point. Note that, for details of the processing of the hook and tap points detection unit 1212, see WO 2020/075335 A.

The VM instruction boundary detection unit 1213 clusters the execution traces and detects the boundary of each VM instruction. The VM instruction boundary detection unit 1213 clusters the execution traces and detects the cluster the number of times of execution of which is greater than or equal to the threshold as the VM instruction. In clustering, a continuous code area executed a plurality of times is detected. This may be done, for example, by putting together those having a close distance on the code between executed instructions, by searching for a common subsequence of executed code blocks, or by other methods. The analysis function providing device 10 detects a start point and an end point of continuous instruction sequence constituting the detected VM instruction as boundaries. The boundary of the VM instruction detected here is used in VPC detection and dispatcher detection.

The virtual program counter detection unit 1214 extracts and analyzes the execution trace for the test script stored in the execution trace DB 131, and detects the VPC. The virtual program counter detection unit 1214 analyzes the plurality of execution traces by using the differential execution analysis focusing on the number of times of reading the memory and the boundary of each VM instruction detected by the VM instruction boundary detection unit 1213, and detects the VPC. The virtual program counter detection unit 1214 detects the VPC by using the fact that reading into the memory holding the VPC always occurs after execution of each VM instruction and finding a destination of the reading.

For this reason, the virtual program counter detection unit 1214 uses the differential execution analysis focusing on the number of times of reading the memory as detection of the VPC. The virtual program counter detection unit 1214 compares the plurality of execution traces of the test script acquired by using the test script, and finds a memory in which the number of times of reading the memory changes in proportion to an increase or decrease in both the number of repetitions and the number of repeated sentences. Then, the virtual program counter detection unit 1214 refers to the boundary of each VM instruction detected by the VM instruction boundary detection unit 1213 and performs narrowing-down to one in which a value of a read memory always points to the start point of the VM instruction. The virtual program counter detection unit 1214 detects this memory as the VPC.

The dispatcher detection unit 1215 cuts out each VM instruction portion from the script engine binary on the basis of the boundary of the VM instruction detected by the VM instruction boundary detection unit 1213, and detects a portion having high similarity between the VM instructions as the dispatcher. As a premise, the dispatcher is implemented by referring to the pointer cache and jumping to the pointer of the next VM instruction handler. Dispatchers are distributedly arranged behind respective VM instruction handlers, and identity of their codes are generally high. The analysis function providing device detects the dispatcher by a predetermined method by searching for a code that is present behind the VM instruction handler and has high identity. For detection of a portion having high similarity, for example, a sequence alignment algorithm may be used, or other methods may be used.

The instruction set architecture analysis unit 122 analyzes an instruction set architecture that is a system of instructions of the VM. The instruction set architecture analysis unit 122 includes a VM execution trace acquisition unit 1221 and a VPC offset detection unit 1222.

Like the execution trace acquisition unit 1211, the VM execution trace acquisition unit 1221 receives the test script and the script engine binary as inputs. The VM execution trace acquisition unit 1221 acquires the VM execution trace by monitoring the VPC and monitoring the pointer of the VM instruction handler dispatched by the dispatcher. The VM execution trace acquisition unit 1221 acquires the VM execution trace that is the execution trace executed on the VM by executing the test script while monitoring execution of the script engine binary. In detection of the branch VM instruction, the VM execution trace acquisition unit 1221 executes a large number of test scripts to acquire the VM execution trace. The VM execution trace acquisition unit 1221 associates the pointer to the VM instruction with the VM instruction, and virtually allocates a VM opcode as an identifier to each.

The VM execution trace is a record of the pointer of the executed VM instruction handler and the VPC. Specifically, the VM execution trace includes the VPC and VM opcode for each executed VM instruction. Recording of the VPC can be implemented by monitoring the memory of the VPC detected by the virtual program counter detection unit 1214. The VM opcode is an identifier virtually allocated to each of the pointers to the VM instructions and the VM instructions associated with each other. The VM execution trace acquired by the VM execution trace acquisition unit 1221 is stored in a VM execution trace DB 133.

The VPC offset detection unit 1222 extracts the VM execution trace acquired by the VM execution trace acquisition unit and stored in the VM execution trace DB 133, and analyzes the log of the VM execution trace. The VPC offset detection unit 1222 acquires the opcode of the VM instruction and the offset value of the VPC before and after execution of the VM instruction as a set from the VM execution trace. An offset o is calculated by $o=p_{next}-p_{prev}$, where the value of the VPC before execution of the VM instruction is $p_{prev}$ and the value after execution is $p_{next}$.

The function providing unit 123 inserts a hook into the script engine on the basis of the acquired architecture information, inserts an exception handler into the script to be analyzed, and provides an exception handling function. The function providing unit 123 includes a hook insertion unit 1231 and an exception handler insertion unit 1232.

The hook insertion unit 1231 inserts a hook into the script engine. The hook insertion unit 1231 applies the hook to the script engine on the basis of architecture information obtained by the analysis by the virtual machine analysis unit 121 and the instruction set architecture analysis unit 122. The hook insertion unit 1231 receives the hook point and the tap point, and inserts the hook into the script engine by using the hook handler on the basis of the hook point and the tap point to provide the analysis function. The hook handler includes processing of setting the value of the next VPC to a value obtained by adding the VPC offset value to the value of the immediately preceding VPC in the VM area.

Specifically, the hook insertion unit 1231 adds, to the hook handler, VPC determination processing of determining the value of the next VPC and VPC change processing of changing the value of the next VPC to the value of the VPC, which is the determined VPC.

The exception handler insertion unit 1232 inserts an exception handler into a script to be analyzed and provides an exception handling function. The exception handler has a function of forcibly transferring processing to a VM area when the occurrence of the exception is caught. The exception handler insertion unit 1232 analyzes the script to be analyzed, and inserts an exception handler by adding a code (see, for example, FIG. 1) of the exception handler to each entry point so that an exception in the code after the entry point can be caught.

The storage unit 13 is implemented by a semiconductor memory element such as random access memory (RAM) or flash memory, or a storage device such as a hard disk or an optical disk, and stores a processing program for operating the analysis function providing device 10, data used during execution of the processing program, and the like. The storage unit 13 includes the execution trace database (DB) 131, the VM execution trace DB 133, and the architecture information DB 132 that stores the architecture information acquired by the virtual machine analysis unit 121 and the instruction set architecture analysis unit 122.

The execution trace DB 131 and the VM execution trace DB 133 store the execution trace and the VM execution trace acquired by the execution trace acquisition unit 1211 and the VM execution trace acquisition unit 1221, respectively. The execution trace DB 131 and the VM execution trace DB 133 are managed by the analysis function providing device 10. Of course, the execution trace DB 131 and the VM execution trace DB 133 may be managed by another device (server or the like), and in this case, the execution trace acquisition unit 1211 and the VM execution trace acquisition unit 1221 output the acquired execution trace and VM execution trace to a management server or the like of the execution trace DB 131 and the VM execution trace DB 133 via a communication interface of the output unit 14, and cause the execution trace DB 131 and the VM execution trace DB 133 to store them.

The output unit 14 is, for example, a liquid crystal display, a printer, or the like, and outputs various types of information including information regarding the analysis function providing device 10. In addition, the output unit 14 may be an interface that controls input and output of various types of data from and to an external device, and may output various types of information to the external device.

[Configuration of Test Script]

The test script will be described. The test script is a script input when the script engine is dynamically analyzed. This test script is used to capture a difference in behavior of the script engine that occurs when, focusing on the number of times of execution of the branch instruction and memory reading/writing, test scripts of different numbers of times are executed. This test script is prepared in advance for analysis and is created manually. This creation requires knowledge about the specification of the target script language.

FIG. 4 is a diagram illustrating an example of a test script used for detection of the VPC. In the test script, repetitive processing is used (second line). In the test script, the condition at the time of execution is changed by increasing or decreasing the number of repetitions (second line) and the number of repeated sentences (third to fifth lines) in the test script, and a difference is generated.

[Configuration of Execution Trace]

Next, the execution trace will be described. FIG. 5 is a diagram illustrating an example of the execution trace. As described above, the execution trace includes a branch trace and a memory access trace. FIG. 5 is a partial cutout of the execution trace. Hereinafter, a configuration of the execution trace will be described with reference to FIG. 5.

The execution trace includes an element called trace. The trace indicates whether the log line is a branch trace or a memory access trace.

The log line of the branch trace has, for example, a format as described in the first to tenth lines in FIG. 5, and includes three elements: type, src, and dst. The type indicates whether the executed branch instruction is based on a call instruction, a jmp instruction, or a ret instruction. In addition, the src indicates an address of a branch source, and the dst indicates an address of a branch destination.

The log line of the memory access trace has, for example, a format as described in the eleventh to thirteenth lines in FIG. 5, and includes three elements: type, target, and value. The type indicates whether the memory access is of reading or writing. The target indicates a memory address that is a target of the memory access. In addition, the value stores a value of a result of the memory access.

[Configuration of VM Execution Trace]

Next, the VM execution trace will be described. FIG. 6 is a diagram illustrating an example of the VM execution trace. As described above, the VM execution trace is a record of the VM opcode and the VPC. FIG. 6 is a partial cutout of the VM execution trace. Hereinafter, a configuration of the VM execution trace will be described with reference to FIG. 6.

The log line of the VM execution trace has, for example, a format as described in FIG. 6, and includes two elements: vpc and vmop (vm opcode). The vpc indicates a value of the VPC. In addition, the vmop indicates a value of the VM opcode virtually allocated for each pointer that is acquired from the pointer cache and indicates the head of the VM instruction handler to be executed.

[Processing of VM Instruction Boundary Detection Unit]

Figure 7:
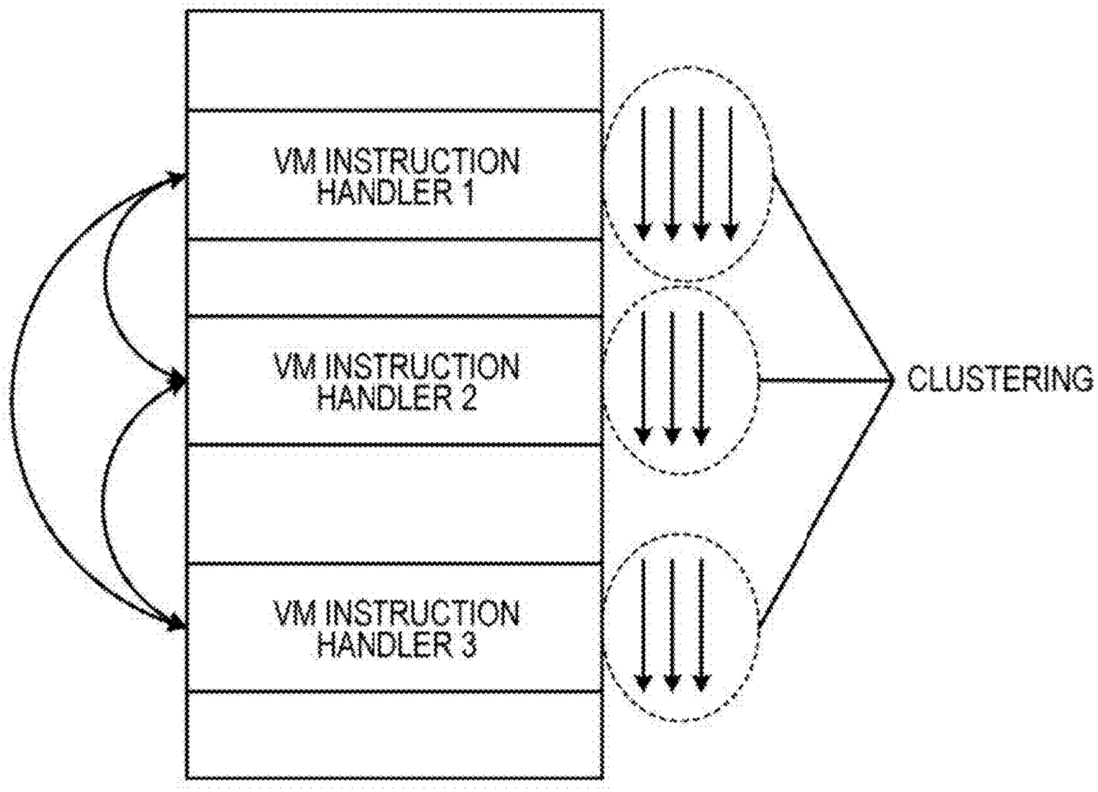
FIG. 7 is a diagram describing processing of a VM instruction boundary detection unit.

Next, processing of the VM instruction boundary detection unit 1213 will be described. FIG. 7 is a diagram describing processing of the VM instruction boundary detection unit 1213.

The VM instruction boundary detection unit 1213 detects the boundary of each VM instruction. At this time, the VM instruction boundary detection unit 1213 detects the VM instruction and the boundary thereof for a threaded code type VM in which it is difficult to grasp the boundary of the VM instruction since there is no interpreter loop. Specifically, the VM instruction boundary detection unit 1213 extracts the execution trace from the execution trace DB 131. Then, as illustrated in FIG. 7, the VM instruction boundary detection unit 1213 clusters the execution traces by a predetermined method, and detects the cluster the number of times of execution of which is greater than or equal to the threshold as the VM instruction (for example, VM instruction handlers 1 to 3). The VM instruction boundary detection unit 1213 detects a start point and an end point of continuous instruction sequence constituting the VM instruction as boundaries.

[Processing of Virtual Program Counter Detection Unit]

Figure 8:
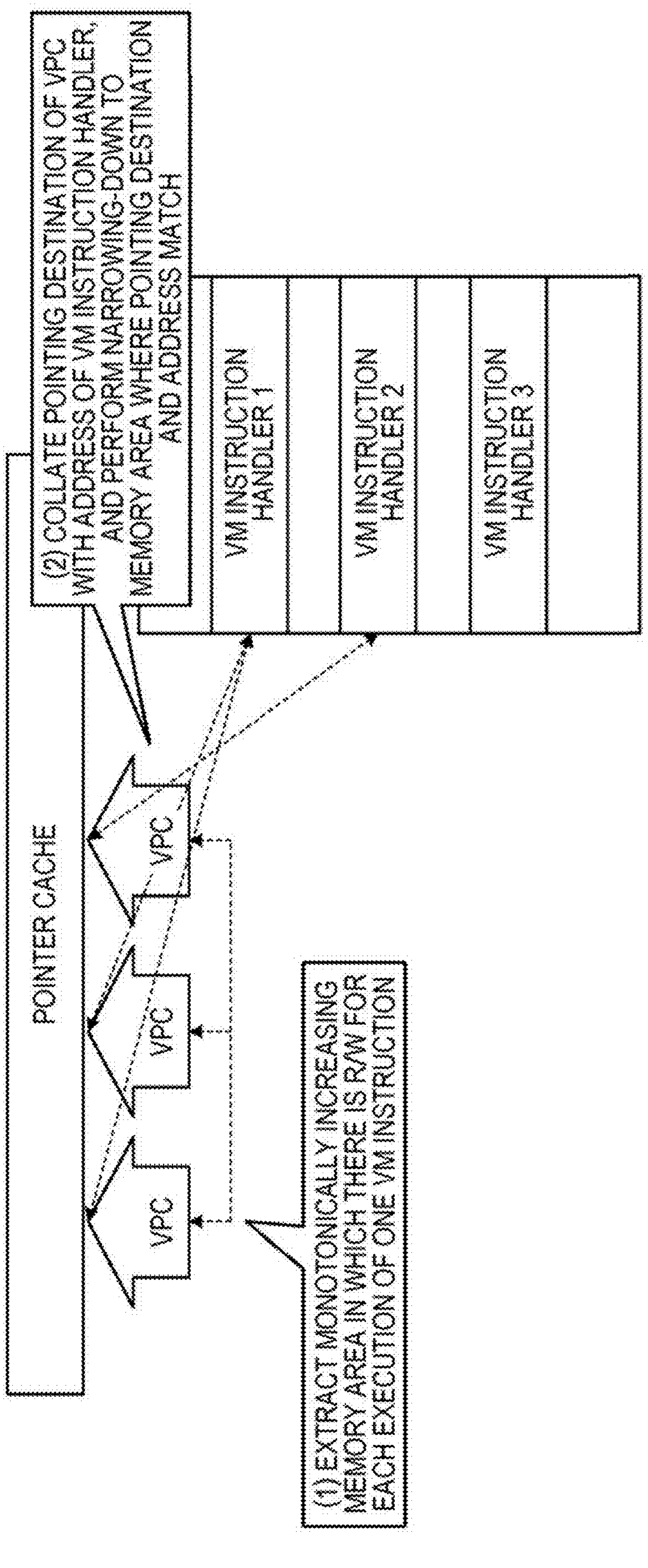
FIG. 8 is a diagram describing processing of a virtual program counter detection unit.

Next, processing of the virtual program counter detection unit 1214 will be described. The virtual program counter detection unit 1214 detects the VPC and the pointer cache. Detection of the virtual program counter is implemented by analyzing the log of the memory access trace of the acquired execution trace. The virtual program counter detection unit 1214 uses the differential execution analysis focusing on the number of times of reading the memory. FIG. 8 is a diagram describing processing of the virtual program counter detection unit 1214.

The virtual program counter detection unit 1214 extracts one execution trace by the test script from the execution trace DB 131. The number of times of reading the VPC is proportional to the number of repetitions in the test script and the number of sentences in the repetitive processing. Assuming that the number of repetitions is N and the number of repeated sentences is M, reading of the VPC of approximately MN occurs. For this reason, the virtual program counter detection unit 1214 extracts memories increased to 4 MN and 9 MN in the execution trace for the test script in which N and M are increased to 2 N and 2 M and 3 N and 3 M, respectively. Specifically, as illustrated in FIG. 8, the virtual program counter detection unit 1214 extracts a monotonically increasing memory area in which there is Read/Write for each execution of one VM instruction ((1) in FIG. 8).

Then, the virtual program counter detection unit 1214 detects, as the VPC, one in which the value of the read memory always points to the start point of the VM instruction. Specifically, the virtual program counter detection unit 1214 collates a pointing destination of the VPC with an address of the VM instruction handler, and performs narrowing-down to a memory area where the pointing destination and the address match ((2) in FIG. 8).

[Processing of Dispatcher Detection Unit]

Figure 9:
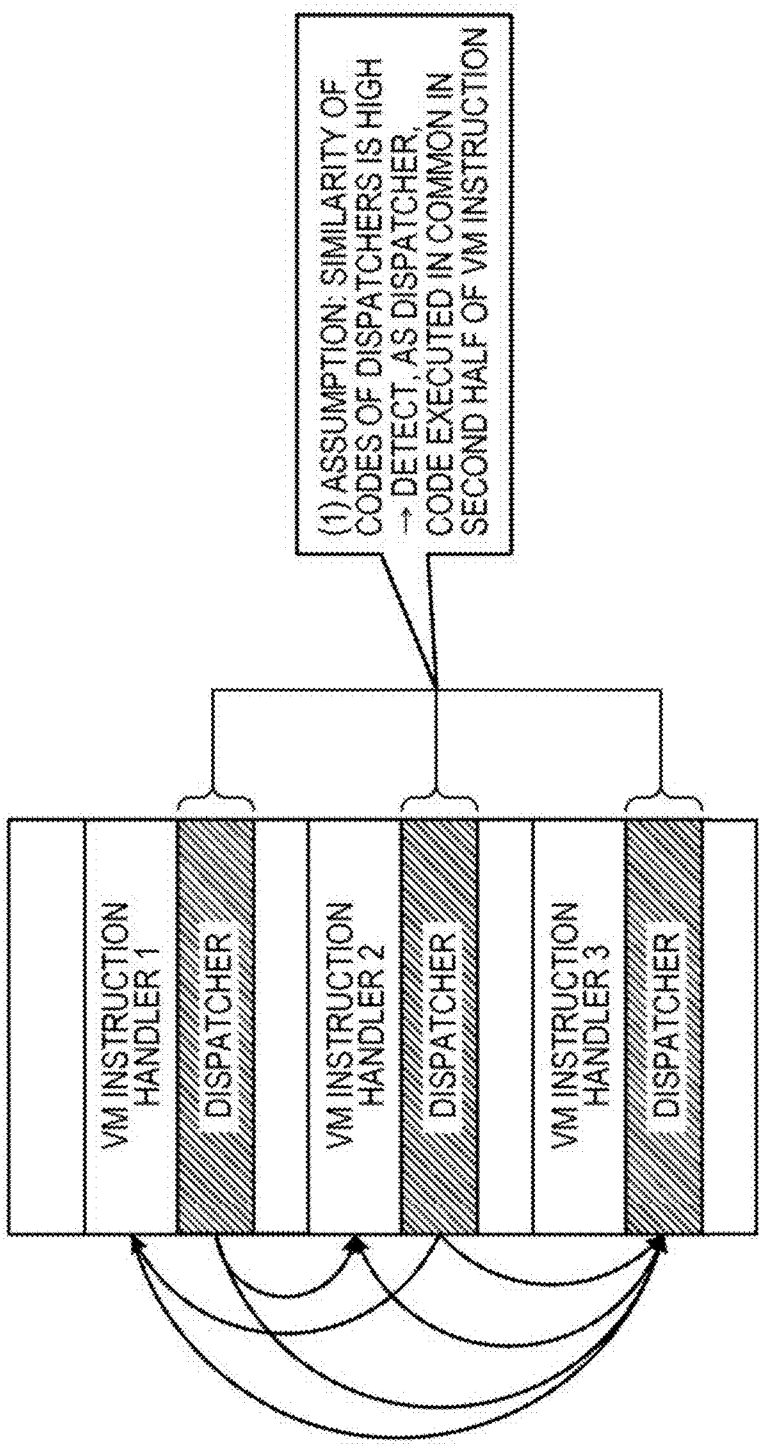
FIG. 9 is a diagram describing processing of a dispatcher detection unit.

Next, processing of the dispatcher detection unit 1215 will be described. The dispatcher detection unit 1215 detects the dispatcher by analyzing the binary of the script engine by a predetermined method. FIG. 9 is a diagram describing processing of the dispatcher detection unit 1215.

The dispatcher detection unit 1215 detects a dispatcher. The dispatcher detection unit 1215 cuts out each VM instruction portion from the script engine binary on the basis of the boundary of the VM instruction detected by the VM instruction boundary detection unit 1213. Then, on the assumption that similarity of codes of dispatchers is high ((1) in FIG. 9), the dispatcher detection unit 1215 calculates the similarity between the codes among the VM instructions, and detects a portion having high similarity among all the VM instructions as the dispatcher. The dispatcher detection unit 1215 can detect, as the dispatcher, a code executed in common in the second half of the VM instruction ((1) in FIG. 9).

[Processing of Hook Insertion Unit]

Next, processing of the hook insertion unit 1231 will be described. The hook insertion unit 1231 receives the script engine binary and the hook point and the tap point detected in the processing so far as inputs. The hook insertion unit 1231 inserts a hook using a hook handler into the hook point of the script engine.

Here, the hook insertion unit 1231 inserts a code for analysis at the time of hooking such that when the script API corresponding to the hook is executed, the execution transitions to the processing of the hook handler in the VM area. The code for analysis can be easily generated as long as the hook point and the tap point are known. As a result, by calling the hooked script API from the script, the function of the hook handler implemented in the VM area can be called as a hypervisor call, and the provision of the analysis function is implemented.

At this time, the hook insertion unit 1231 adds the VPC determination processing (first processing) and the VPC update processing (second processing) to the hook handler.

Figure 10:
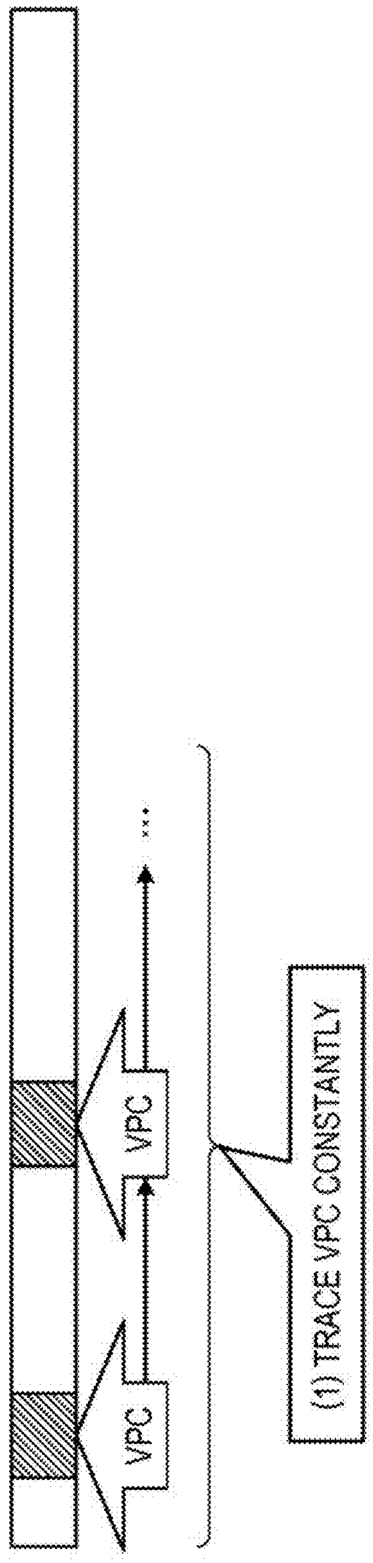
FIG. 10 is a diagram describing an example of VPC determination processing.
Figure 11:
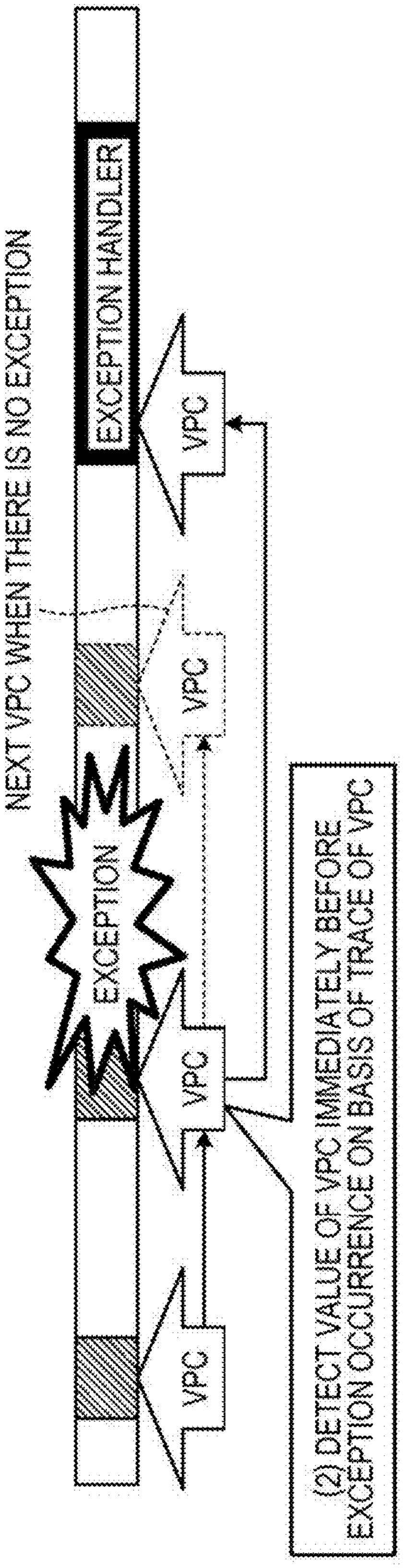
FIG. 11 is a diagram describing an example of VPC determination processing.
Figure 12:
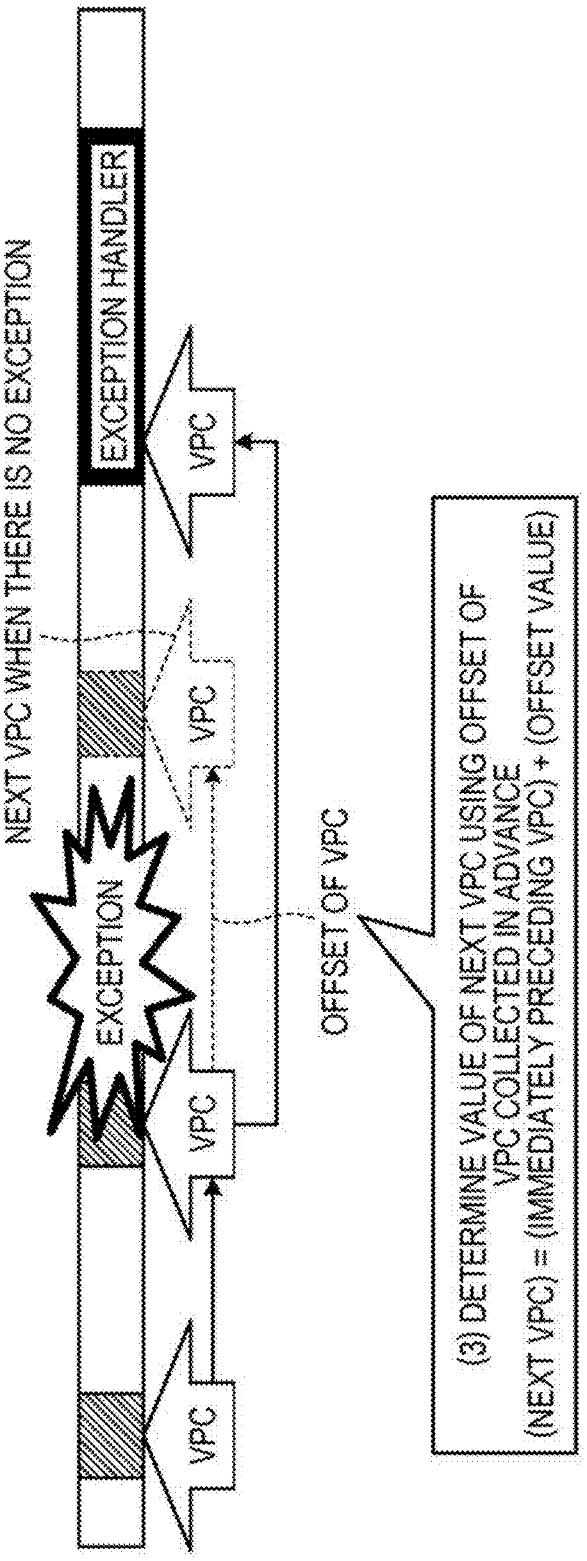
FIG. 12 is a diagram describing an example of VPC determination processing.

FIGS. 10 to 12 are diagrams describing an example of VPC determination processing. In the VPC determination processing, the VPC is constantly traced ((1) in FIG. 10). In the VPC determination processing, the value of the VPC immediately before the exception occurrence is detected from the latest entry of the trace of the VPC on the basis of the trace of the VPC ((2) in FIG. 11). Then, in the VPC determination processing, the value of the next VPC is determined using the offset of the VPC collected in advance by the VPC offset detection unit 1222 ((3) in FIG. 12). The value of the next VPC is a value obtained by adding the offset value of the VPC to the value of the VPC immediately before the exception occurrence.

Figure 13:
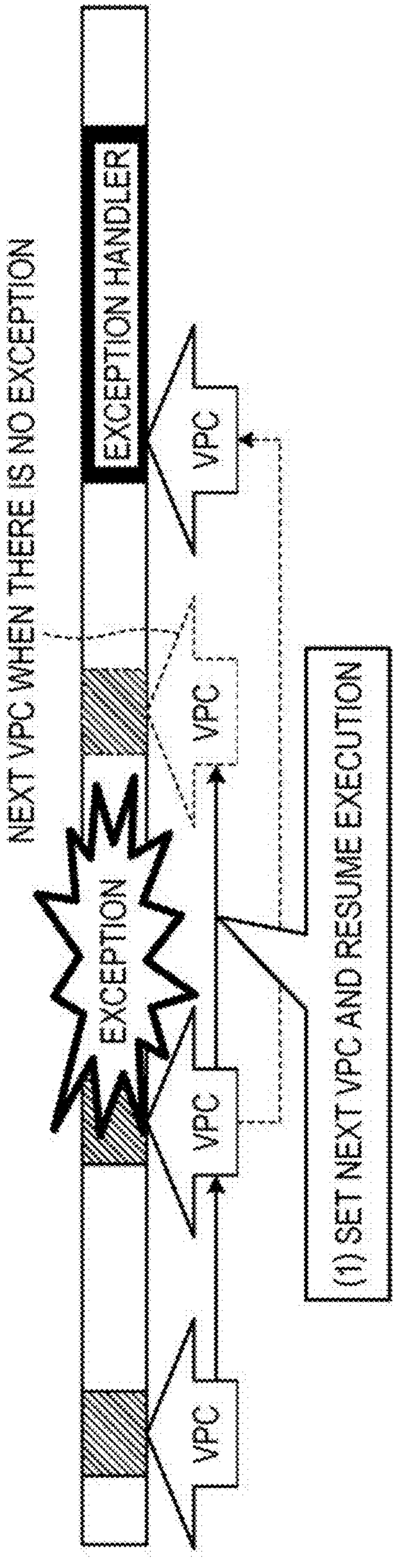
FIG. 13 is a diagram describing an example of VPC update processing.

FIG. 13 is a diagram describing an example of VPC update processing. In the VPC update processing, the value of the next VPC determined in the VPC determination processing is set to the value of the next VPC, and the execution is resumed ((1) in FIG. 13). The exception skip function can be provided to the script to be analyzed by adding the VPC determination processing and the VPC update processing.

[Processing Procedure of Analysis Function Providing Device]

Figure 14:
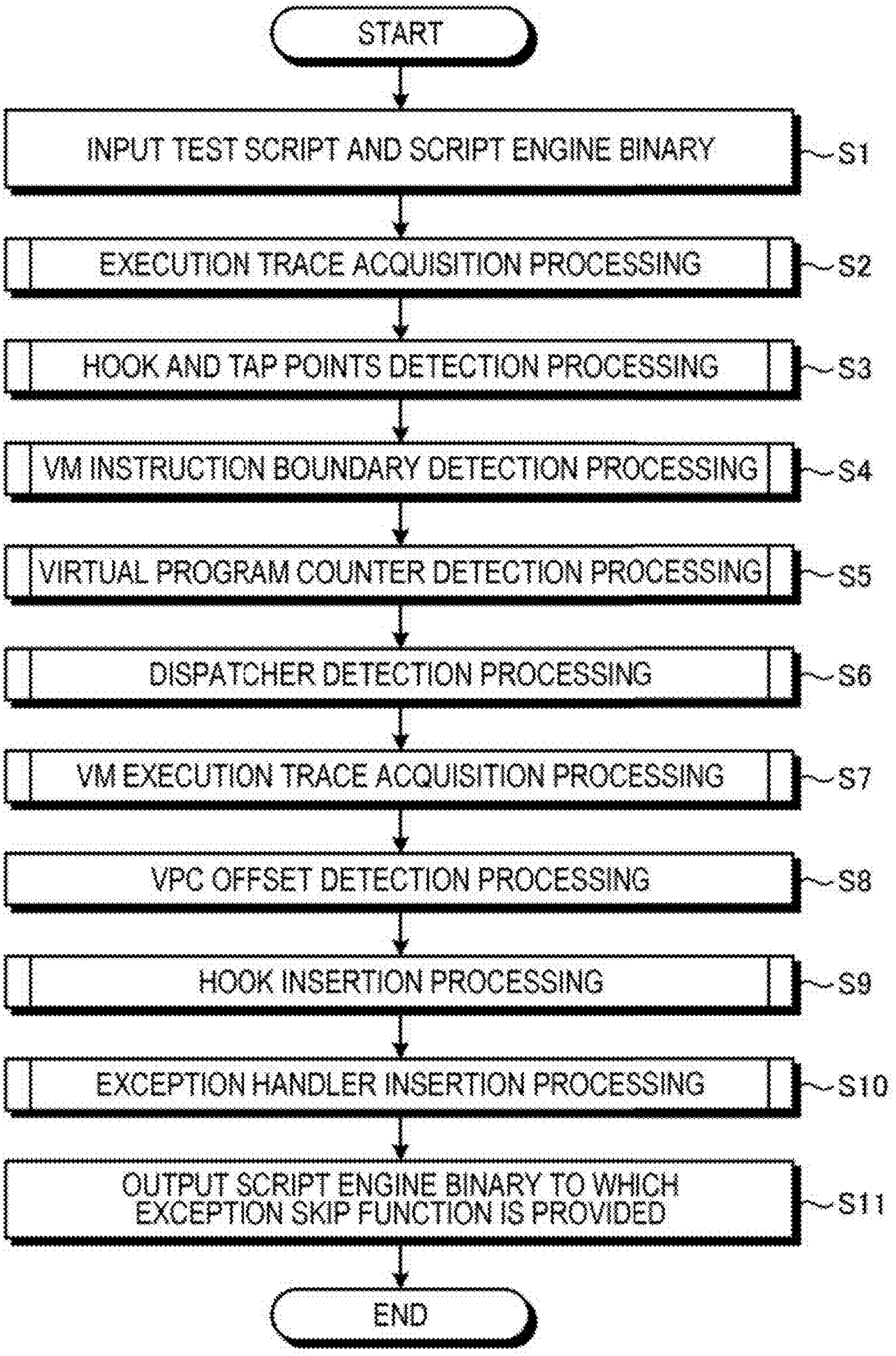
FIG. 14 is a flowchart illustrating a processing procedure of analysis function providing processing according to the embodiment.

Next, a processing procedure of analysis function providing processing by the analysis function providing device 10 will be described. FIG. 14 is a flowchart illustrating a processing procedure of analysis function providing processing according to the embodiment.

First, the input unit 11 receives the test script and the script engine binary as inputs (step S1).

Then, the execution trace acquisition unit 1211 performs execution trace acquisition processing of executing the test script while monitoring the binary of the script engine to acquire the branch trace and the memory access trace (step S2).

The hook and tap points detection unit 1212 performs hook and tap points detection processing of analyzing the virtual machine on the basis of the execution trace acquired by the execution trace acquisition unit 1211 and detecting a hook point and a tap point (step S3).

The VM instruction boundary detection unit 1213 performs VM instruction boundary detection processing of detecting the VM instruction and detecting the boundary of the VM instruction (step S4). The virtual program counter detection unit 1214 performs virtual program counter detection processing of extracting and analyzing the execution trace for the test script stored in the execution trace DB 131 and finding the VPC (step S5).

The dispatcher detection unit 1215 performs dispatcher detection processing of cutting out each VM instruction portion from the script engine binary and detecting a portion having high similarity between the VM instructions as the dispatcher (step S6).

The VM execution trace acquisition unit 1221 performs VM execution trace acquisition processing of receiving the test script and the script engine binary as inputs and executing the test script while monitoring execution of the script engine binary to acquire the VM execution trace (step S7). The VPC offset detection unit 1222 performs VPC offset detection processing of acquiring the opcode of the VM instruction and the offset value of the VPC before and after execution of the instruction as a set from the VM execution trace (step S8).

The hook insertion unit 1231 performs hook insertion processing of inserting a hook into the script engine on the basis of the architecture information acquired in the processing of steps S1 to S6 (step S9). Then, the exception handler insertion unit 1232 performs exception handler insertion processing of inserting an exception handler into a script to be analyzed and providing an exception handling function (step S10). Then, the output unit 14 outputs the script engine binary to which the exception skip function is provided (step S11).

[Processing Procedure of Execution Trace Acquisition Processing]

Figure 15:
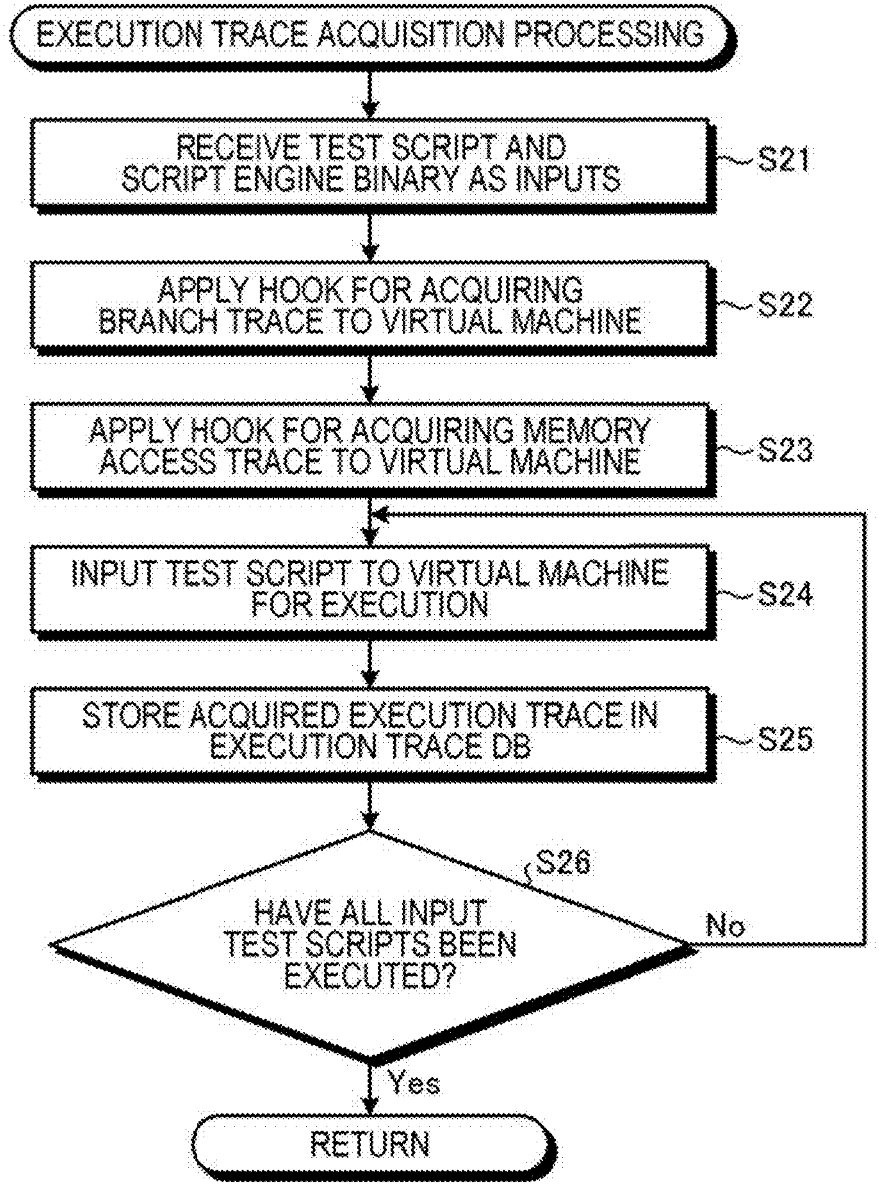
FIG. 15 is a flowchart illustrating a processing procedure of execution trace acquisition processing illustrated in FIG. 14.

Next, a flow of the execution trace acquisition processing illustrated in FIG. 14 will be described. FIG. 15 is a flowchart illustrating a processing procedure of the execution trace acquisition processing illustrated in FIG. 14.

First, the execution trace acquisition unit 1211 receives the test script and the script engine binary as inputs (step S21). Then, the execution trace acquisition unit 1211 applies a hook for acquiring the branch trace to the received script engine (step S22). In addition, the execution trace acquisition unit 1211 also applies a hook for acquiring the memory access trace to the received script engine (step S23).

Then, the execution trace acquisition unit 1211 inputs the test script received in that state to the script engine for execution (step S24), and stores the execution trace acquired by the execution in the execution trace DB 131 (step S25).

The execution trace acquisition unit 1211 determines whether or not all the input test scripts have been executed (step S26). In a case where all the input test scripts have been executed (step S26: Yes), the execution trace acquisition unit 1211 ends the processing. On the other hand, in a case where not all the input test scripts have been executed (step S26: No), the execution trace acquisition unit 1211 returns to the execution of the test script in step S24 and continues the processing.

[Processing Procedure of Hook and Tap Points Detection Processing]

Figure 16:
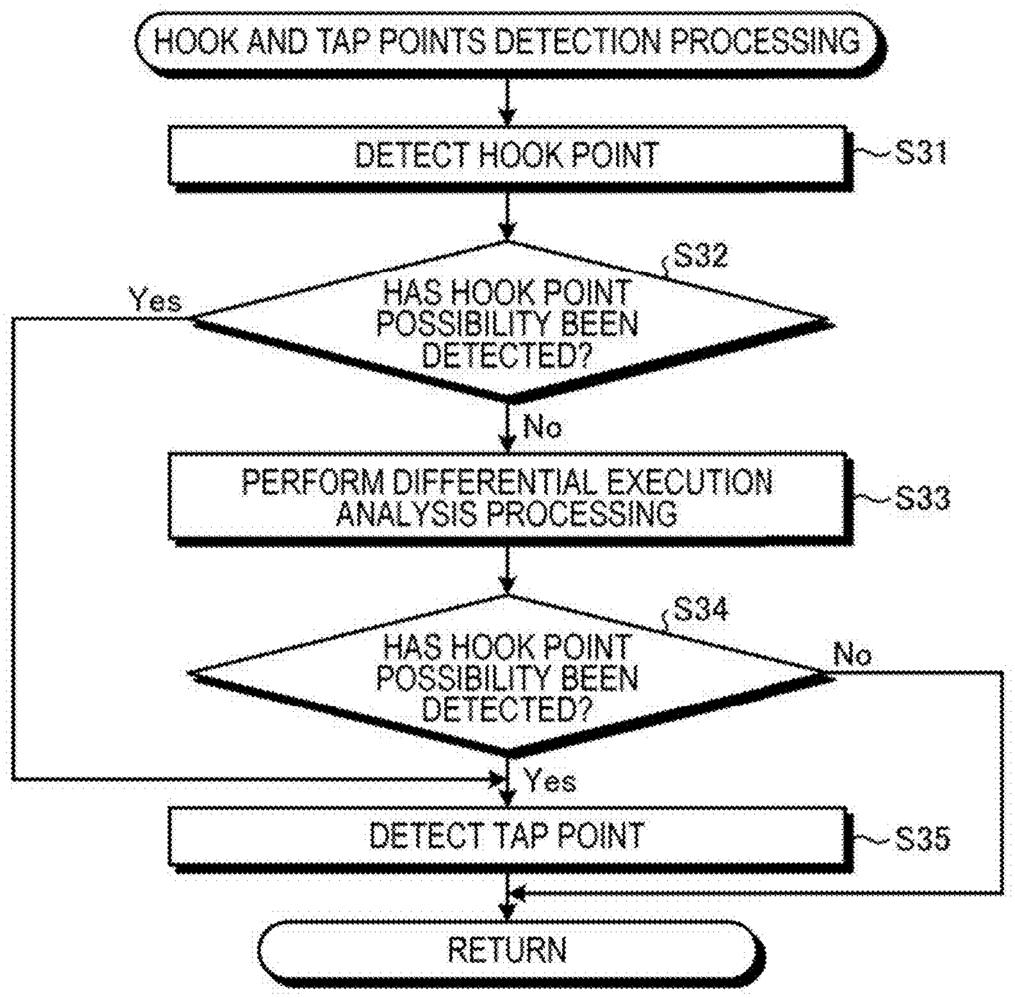
FIG. 16 is a flowchart illustrating a processing procedure of hook and tap points detection processing illustrated in FIG. 14.

FIG. 16 is a flowchart illustrating a processing procedure of hook and tap points detection processing illustrated in FIG. 14.

As illustrated in FIG. 16, in the hook and tap points detection processing, the hook and tap points detection unit 1212 detects a hook point possibility (step S31). When a hook point possibility is detected (step S32: Yes), the hook and tap points detection unit 1212 proceeds to step S35. On the other hand, when no hook point possibility is detected (step S32: No), the hook and tap points detection unit 1212 performs differential execution analysis processing of detecting a hook point on the basis of a difference seen between execution traces in which a plurality of conditions is changed (step S33).

Then, when no hook point possibility is detected (step S34: No), the hook and tap points detection unit 1212 ends the processing since there is no hook point possibility. On the other hand, when a hook point possibility is detected (step S34: Yes), the hook and tap points detection unit 1212 proceeds to step S35. The hook and tap points detection unit 1212 detects a tap point (step S35).

[Processing Procedure of VM Instruction Boundary Detection Processing]

Figure 17:
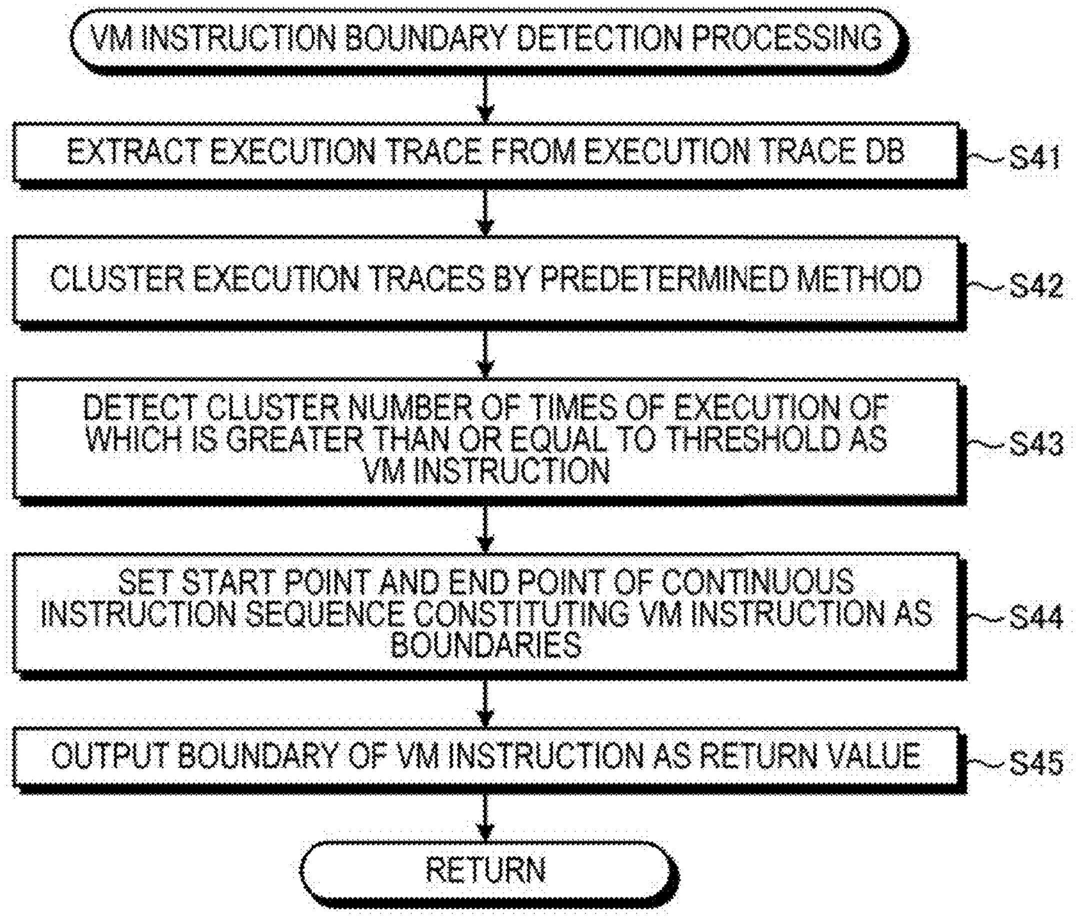
FIG. 17 is a flowchart illustrating a processing procedure of VM instruction boundary detection processing illustrated in FIG. 14.

Next, a flow of the VM instruction boundary detection processing illustrated in FIG. 14 will be described. FIG. 17 is a flowchart illustrating a processing procedure of the VM instruction boundary detection processing illustrated in FIG. 14.

First, the VM instruction boundary detection unit 1213 extracts the execution trace from the execution trace DB 131 (step S41). The VM instruction boundary detection unit 1213 clusters the execution traces by a predetermined method (step S42). Any method may be used for clustering.

The VM instruction boundary detection unit 1213 detects the cluster the number of times of execution of which is greater than or equal to the threshold as the VM instruction (step S43). Then, the VM instruction boundary detection unit 1213 sets the start point and the end point of the continuous instruction sequence constituting the VM instruction as boundaries (step S44). The VM instruction boundary detection unit 1213 outputs the boundary of the VM instruction as a return value (step S45), and ends the VM instruction boundary detection processing.

[Processing Procedure of Virtual Program Counter Detection Processing]

Figure 18:
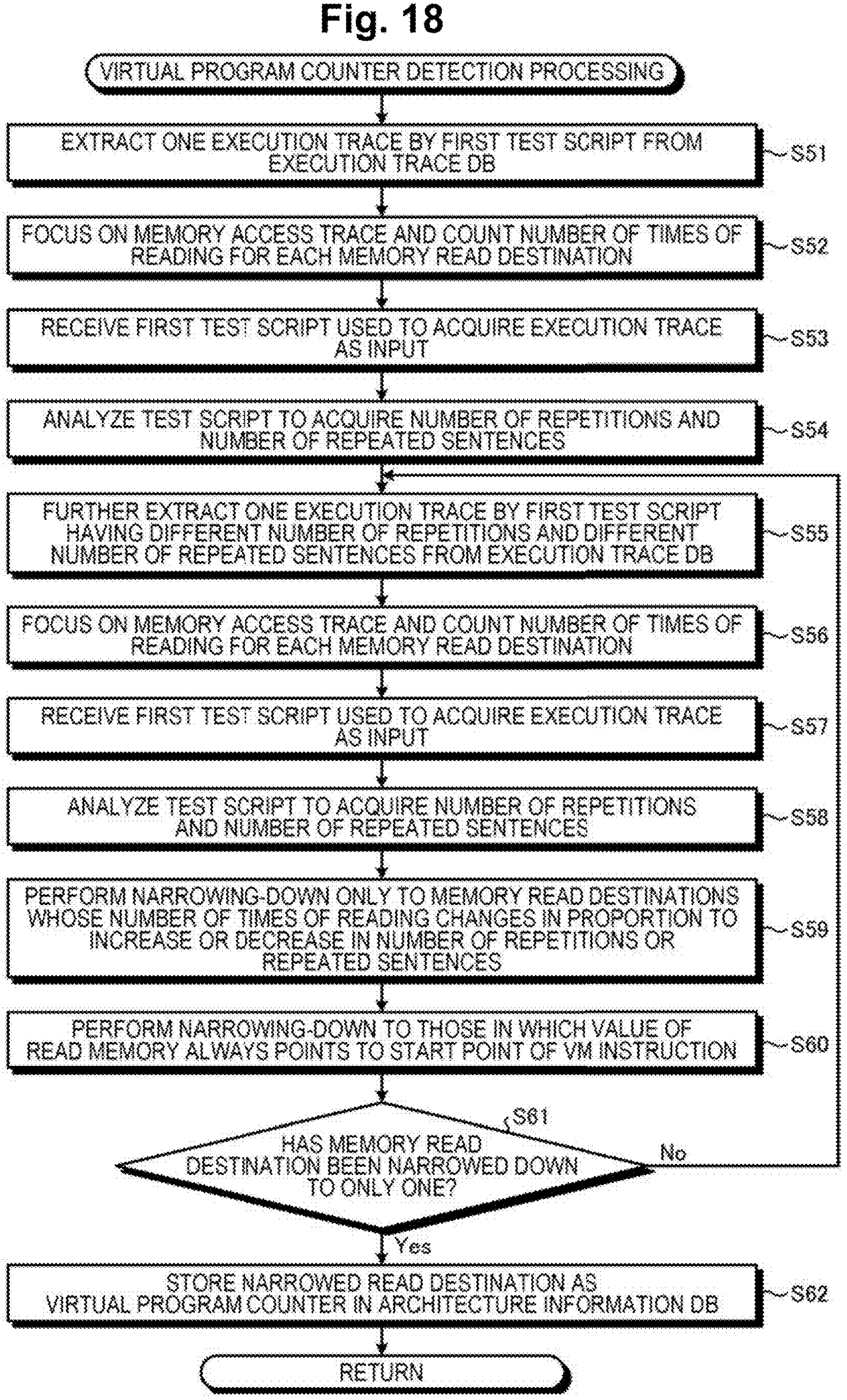
FIG. 18 is a flowchart illustrating a processing procedure of virtual program counter detection processing illustrated in FIG. 14.

Next, a flow of the virtual program counter detection processing illustrated in FIG. 14 will be described. FIG. 18 is a flowchart illustrating a processing procedure of the virtual program counter detection processing illustrated in FIG. 14.

First, the virtual program counter detection unit 1214 extracts one execution trace by the test script from the execution trace DB 131 (step S51). Subsequently, the virtual program counter detection unit 1214 focuses on the memory access trace in the execution trace and counts the number of times of reading for each memory read destination (step S52).

The virtual program counter detection unit 1214 receives the test script used to acquire the execution trace as an input (step S53), and analyzes the test script to acquire the number of repetitions and the number of repeated sentences (step S54).

Subsequently, the virtual program counter detection unit 1214 further extracts one execution trace by the test script having a different number of repetitions and a different number of repeated sentences from the execution trace DB 131 (step S55). Then, the virtual program counter detection unit 1214 focuses on the memory access trace and counts the number of times of reading for each memory read destination (step S56). In addition, the virtual program counter detection unit 1214 receives the test script used to acquire the execution trace as an input (step S57), analyzes the test script to acquire the number of repetitions and the number of repeated sentences (step S58).

Here, the virtual program counter detection unit 1214 performs narrowing-down only to memory read destinations whose number of times of reading changes in proportion to an increase or decrease in the number of repetitions or the repeated sentences (step S59). Further, the virtual program counter detection unit 1214 narrows down the memory read destinations narrowed down in step S59 to those in which the value of the read memory always points to the start point of the VM instruction (step S60).

Then, the virtual program counter detection unit 1214 determines whether or not the memory read destination has been narrowed down to only one (step S61). In a case where the memory read destination has not been narrowed down to only one (step S61: No), the virtual program counter detection unit 1214 returns to step S55, extracts one next execution trace, and continues the processing. On the other hand, in a case where the memory read destination has been narrowed down to only one (step S61: Yes), the virtual program counter detection unit 1214 stores the narrowed memory read destination as the virtual program counter in the architecture information DB 132 (step S62), and ends the processing.

[Processing Procedure of Dispatcher Detection Processing]

Figure 19:
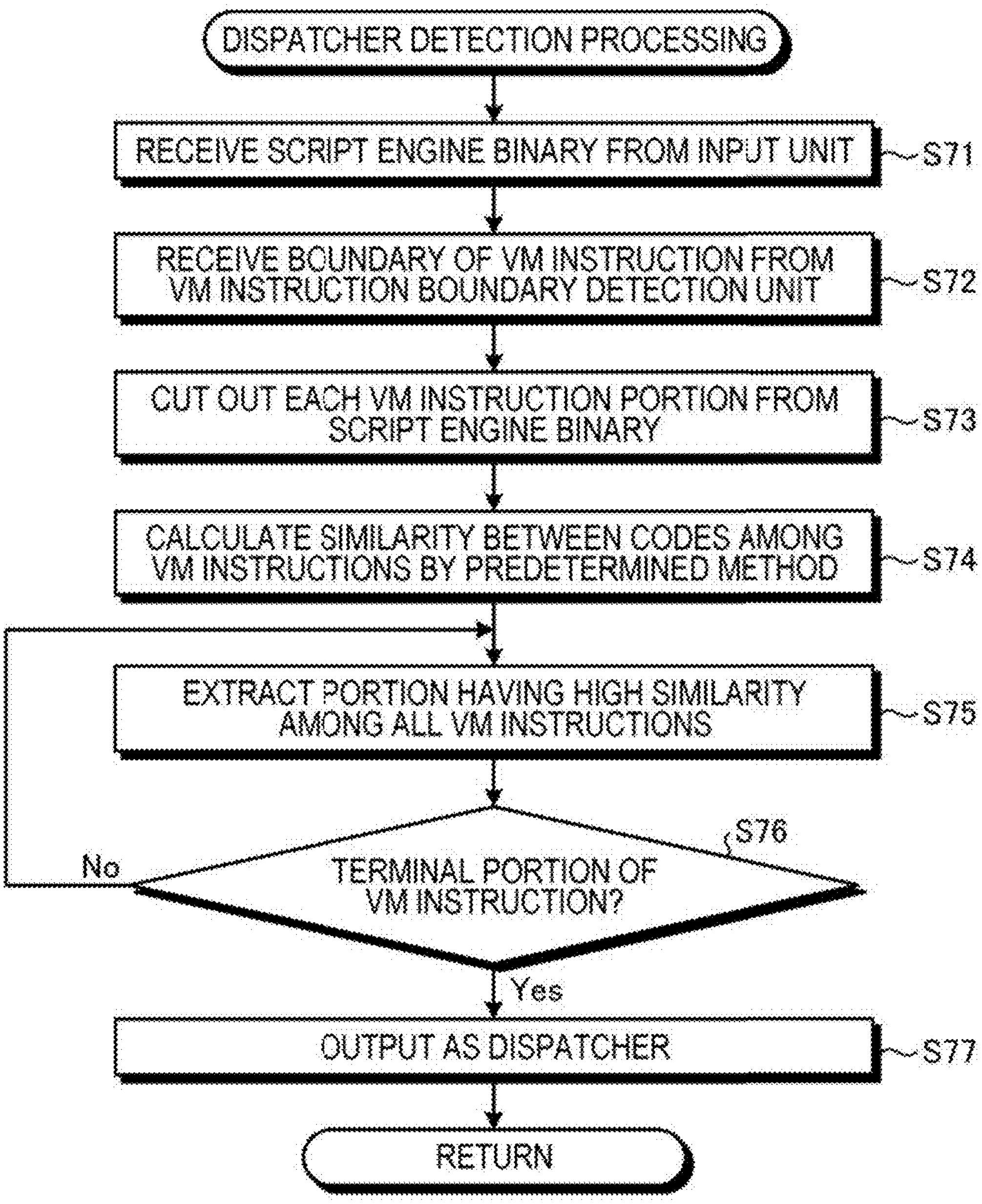
FIG. 19 is a diagram describing processing of a dispatcher detection unit.

Next, a flow of the dispatcher detection processing illustrated in FIG. 14 will be described. FIG. 19 is a flowchart illustrating a processing procedure of the dispatcher detection processing illustrated in FIG. 14. First, the dispatcher detection unit 1215 receives the script engine binary as an input (step S71). The dispatcher detection unit 1215 receives the boundary of the VM instruction from the VM instruction boundary detection unit 1213 (step S72).

The dispatcher detection unit 1215 cuts out each VM instruction portion from the script engine binary on the basis of the boundary of the VM instruction received from the VM instruction boundary detection unit 1213 (step S73). The dispatcher detection unit 1215 calculates the similarity between the codes among the VM instructions by a predetermined method (step S74). The similarity calculation method may be any method as long as the similarity between the codes can be calculated.

The dispatcher detection unit 1215 extracts a portion having high similarity among all the VM instructions on the basis of the similarity calculated in step S74 (step S75). Then, the dispatcher detection unit 1215 determines whether the extracted portion is a terminal portion of the VM instruction (step S76).

In a case where the extracted portion is not the terminal portion of the VM instruction (step S76: No), the dispatcher detection unit 1215 returns to step S75 and continues the processing. In addition, in a case where the extracted portion is the terminal portion of the VM instruction (step S76: Yes), the dispatcher detection unit 1215 outputs the extracted portion as the dispatcher (step S77), and ends the processing.

[Processing Procedure of VM Execution Trace Acquisition Processing]

Figure 20:
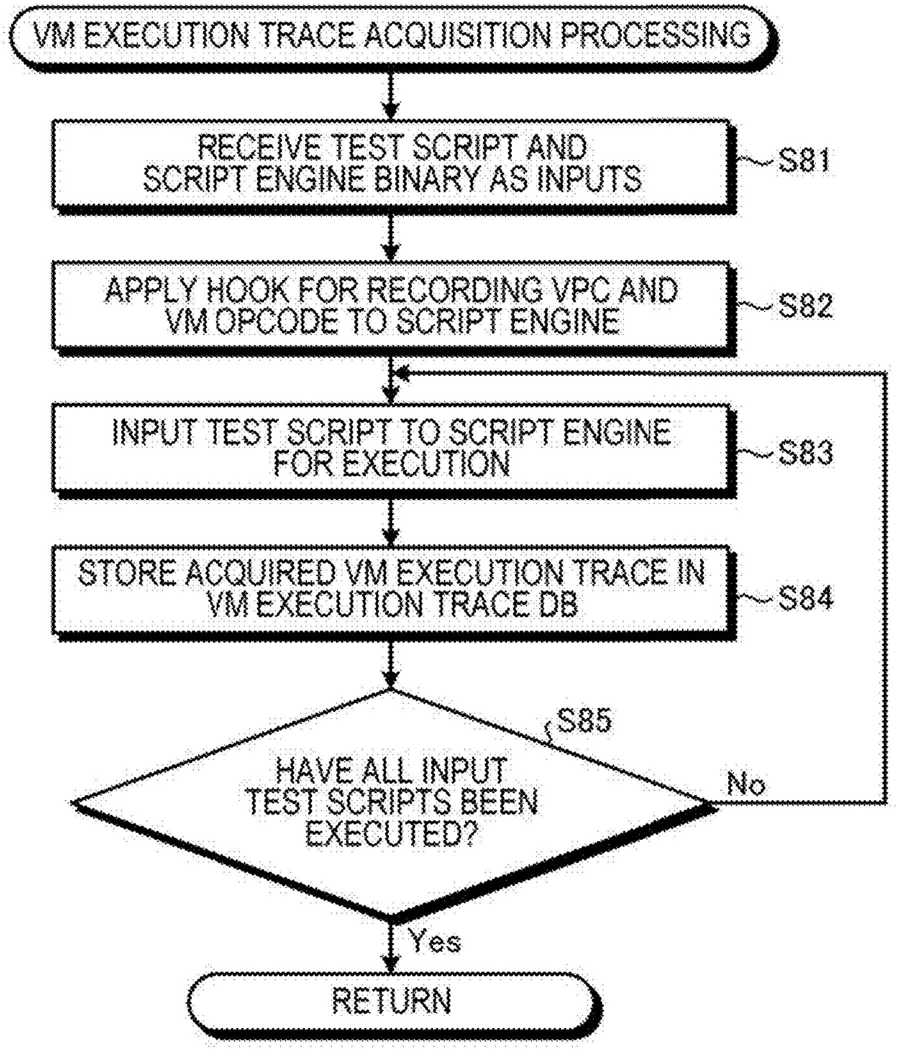
FIG. 20 is a flowchart illustrating a processing procedure of VM execution trace acquisition processing illustrated in FIG. 14.

Next, a flow of the VM execution trace acquisition processing illustrated in FIG. 14 will be described. FIG. 20 is a flowchart illustrating a processing procedure of VM execution trace acquisition processing illustrated in FIG. 14.

First, the VM execution trace acquisition unit 1221 receives the test script and the script engine binary as inputs (step S81). Then, the VM execution trace acquisition unit 1221 applies a hook for recording the VPC and the VM opcode to the received script engine (step S82).

The VM execution trace acquisition unit 1221 inputs the test script received in that state to the script engine for execution (step S83), and stores the VM execution trace acquired by the execution in the VM execution trace DB 133 (step S84).

The VM execution trace acquisition unit 1221 determines whether or not all the input test scripts have been executed (step S85). In a case where all the input test scripts have been executed (step S85: Yes), the VM execution trace acquisition unit 1221 ends the processing. In a case where not all the input test scripts have been executed (step S85: No), the VM execution trace acquisition unit 1221 returns to the execution of the test script in step S83 and continues the processing.

[Hook Insertion Processing]

Figure 21:
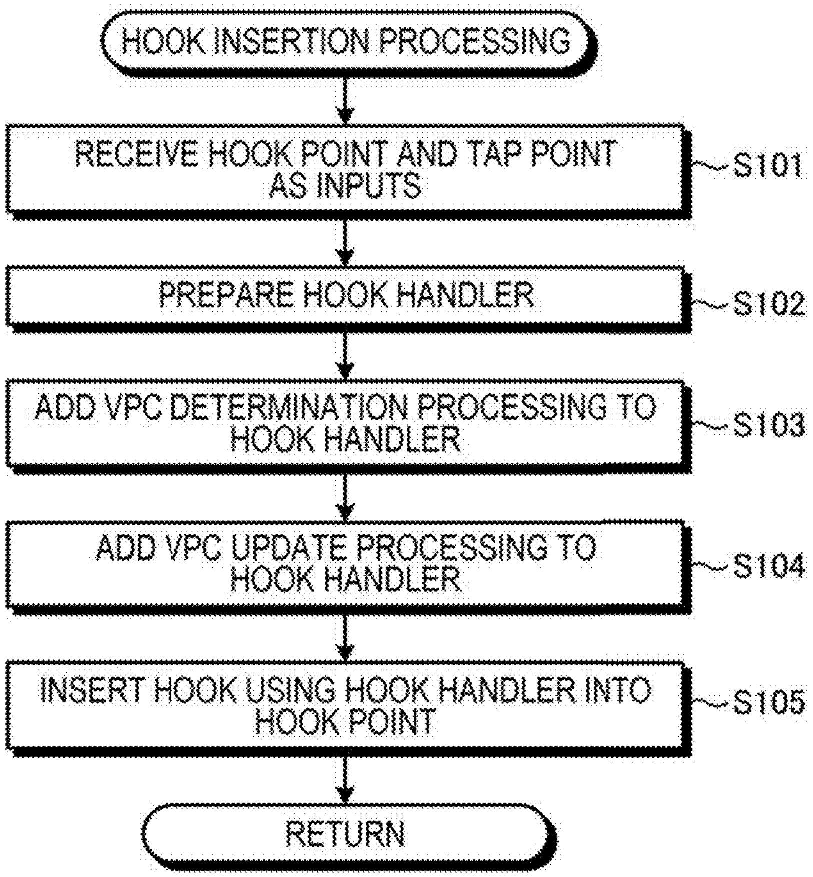
FIG. 21 is a flowchart illustrating a processing procedure of hook insertion processing illustrated in FIG. 14.

Next, a flow of hook insertion processing illustrated in FIG. 14 will be described. FIG. 21 is a flowchart illustrating a processing procedure of hook insertion processing illustrated in FIG. 14.

First, the hook insertion unit 1231 receives the hook point and the tap point detected by the hook and tap points detection unit 1212 as inputs (step S101), and prepares the hook handler (step S102).

The hook insertion unit 1231 adds the VPC determination processing to the hook handler (step S103). The hook insertion unit 1231 adds the VPC update processing to the hook handler (step S104). The hook insertion unit 1231 inserts a hook using the hook handler into the hook point (step S105).

[VPC Determination Processing]

Figure 22:
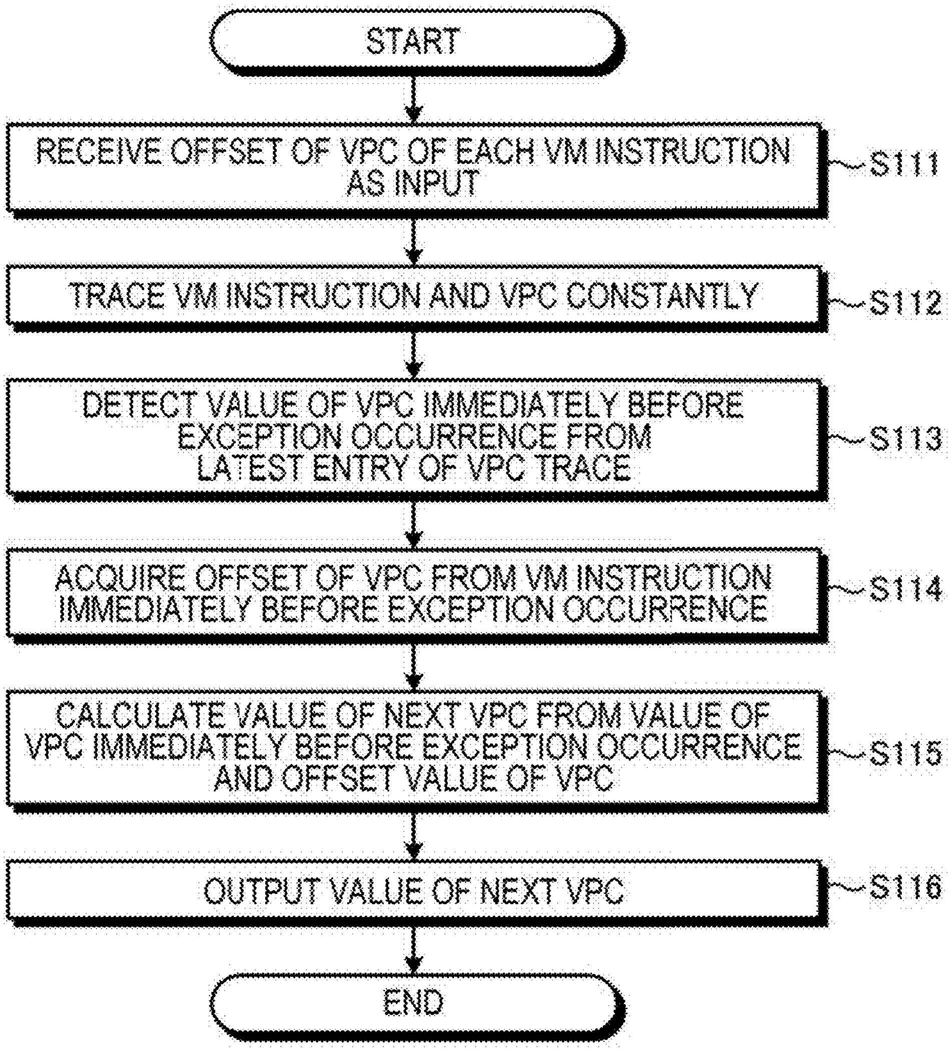
FIG. 22 is a flowchart illustrating a processing procedure of the VPC determination processing.

FIG. 22 is a flowchart illustrating a processing procedure of the VPC determination processing. In the VPC determination processing, the offset of the VPC of each VM instruction is received as an input (step S111).

In the VPC determination processing, the VM instruction and the VPC are constantly traced (step S112). In the VPC determination processing, the value of the VPC immediately before the exception occurrence is detected from the latest entry of the trace of the VPC on the basis of the trace of the VPC (step S113).

In the VPC determination processing, the offset of the VPC is acquired from the VM instruction immediately before the exception occurrence (step S114). In the VPC determination processing, the value of the next VPC is calculated from the value of the VPC immediately before the exception occurrence and the offset value of the VPC (step S115). In the VPC determination processing, the value of the next VPC is output (step S116).

[VPC Update Processing]

Figure 23:
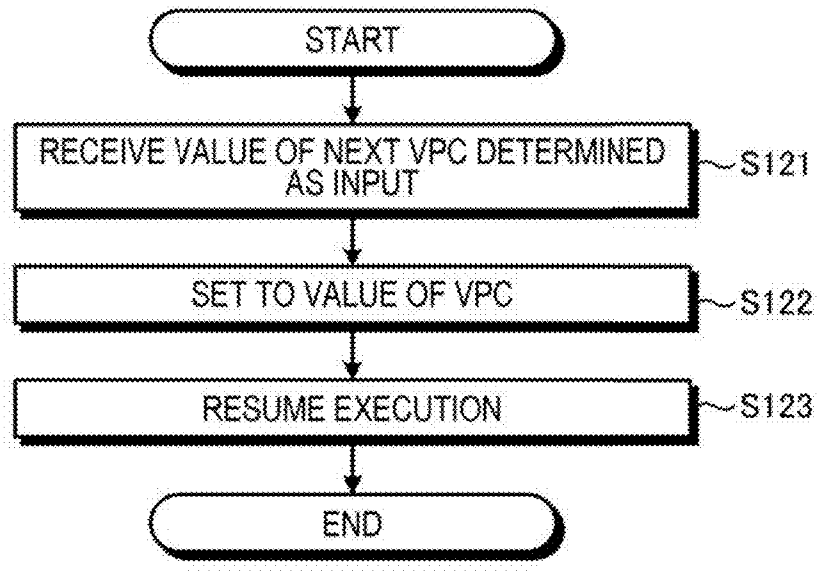
FIG. 23 is a flowchart illustrating a processing procedure of the VPC update processing.

FIG. 23 is a flowchart illustrating a processing procedure of the VPC update processing. In the VPC update processing, the value of the next VPC determined in the VPC determination processing is received as an input (step S121), and is set to the value of the VPC (step S122). In the VPC update processing, the execution is resumed (step S123).

[Exception Handler Insertion Processing]

Figure 24:
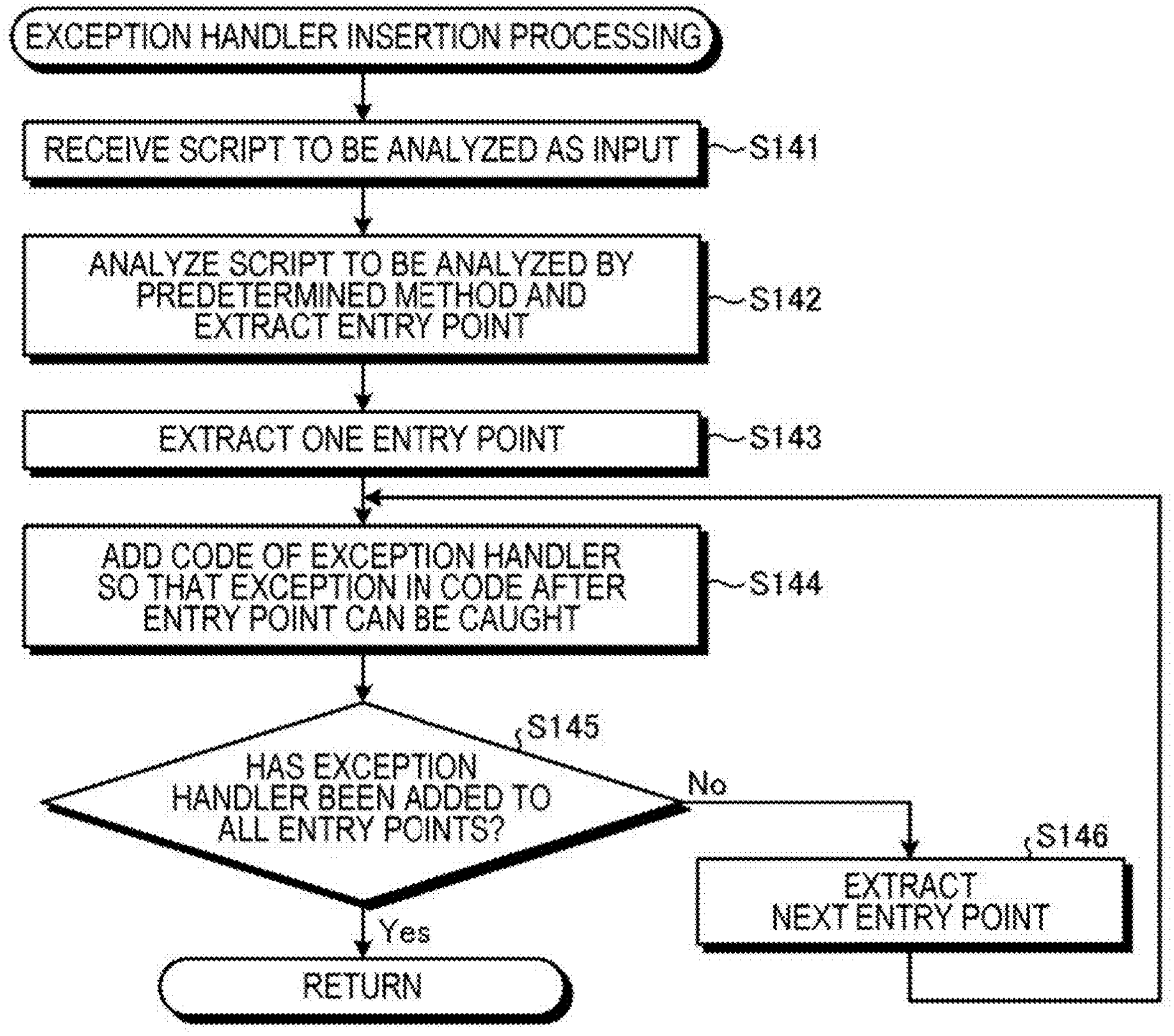
FIG. 24 is a flowchart illustrating a processing procedure of exception handler insertion processing illustrated in FIG. 14.

A flow of exception handler insertion processing illustrated in FIG. 14 will be described. FIG. 24 is a flowchart illustrating a processing procedure of exception handler insertion processing illustrated in FIG. 14.

The exception handler insertion unit 1232 receives the script to be analyzed as an input (step S141). The exception handler insertion unit 1232 analyzes the script to be analyzed by a predetermined method and extracts an entry point (step S142).

The exception handler insertion unit 1232 extracts one entry point (step S143). The exception handler insertion unit 1232 adds the code of the exception handler (see, for example, FIG. 1) so that an exception in the code after the entry point can be caught (step S144).

The exception handler insertion unit 1232 determines whether or not an exception handler has been added to all entry points (step S145). When the exception handler has not been added to all the entry points (step S145: No), the exception handler insertion unit 1232 extracts the next entry point (step S146), proceeds to step S144, and adds the code of the exception handler.

When the exception handler is added to all the entry points (step S145: Yes), the exception handler insertion unit 1232 ends the processing.

Effects of the Embodiment

As described above, the analysis function providing device 10 according to the embodiment executes the test script while monitoring the binary of the script engine to acquire the branch trace and the memory access trace as the execution trace. The analysis function providing device 10 analyzes the virtual machine on the basis of the execution trace, and acquires architecture information of the hook point, the tap point, the VPC, the VM instruction boundary, and the dispatcher. Further, the analysis function providing device 10 executes the test script to acquire the VM execution trace, detects the offset value of the VPC by using the VM execution trace and acquires the offset value as architecture information.

Then, the analysis function providing device 10 applies, to the hook point of the script engine, a hook including processing of setting the value of the next VPC to a value obtained by adding the VPC offset value to the value of the immediately preceding VPC when the exception has occurred on the basis of the obtained architecture information, and provides the analysis function including the exception handling function.

Specifically, the analysis function providing device 10 provides the exception handling function by inserting, to the script to be analyzed, an exception handler that forcibly transfers processing to the VM area when the occurrence of the exception is caught. The analysis function providing device 10 applies the hook by using the hook handler including processing of setting the value of the next VPC to a value obtained by adding the VPC offset value to the value of the immediately preceding VPC in the VM area. As a result, the analysis function providing device 10 suppresses the stop of the execution due to the exception by skipping the basic block in which the exception has occurred.

As a result, the analysis function providing device 10 can detect various types of architecture information by analysis based on acquisition of the execution trace and the VM execution trace and can implement provision of the exception handling function without requiring manual reverse engineering even for a proprietary script engine for which only the binary can be obtained.

In addition, since the analysis function providing device 10 can automatically provide the exception handling function to various script engines only by preparing a test script, it is possible to provide the exception handling function without requiring individual design and implementation.

As described above, the analysis function providing device 10 is useful for analyzing the behavior of malicious scripts described in various script languages, and is suitable for analyzing the behavior of malicious scripts in which execution is stopped due to an exception during the analysis without being affected by the malicious script. For this reason, by providing various script engines with the exception handling function by using the analysis function providing device 10, even in a case where there is an exception, it is possible to analyze the behavior of the malicious script while suppressing the stop of execution due to the exception and utilize the analysis for countermeasures such as detection.

Note that the analysis function providing device 10 can similarly catch an exception in multipath execution by forcing the execution path and continue the analysis while preventing unintended stop of the execution.

[Regarding System Configuration of the Embodiment]

Each component of the analysis function providing device 10 illustrated in FIG. 3 is functionally conceptual, and does not necessarily need to be physically configured as illustrated. That is, specific forms of distribution and integration of the functions of the analysis function providing device 10 are not limited to the illustrated forms, and all or a part thereof can be functionally or physically distributed or integrated in any unit according to various loads, usage conditions, and the like.

In addition, all or any part of each of pieces of processing performed in the analysis function providing device 10 may be implemented by the CPU and a program analyzed and executed by the CPU. In addition, each of the pieces of processing performed in the analysis function providing device 10 may be implemented as hardware by wired logic.

In addition, among the pieces of processing described in the embodiment, all or part of the processing described as being automatically performed can be manually performed. Alternatively, all or part of the processing described as being manually performed can be automatically performed by a known method. In addition, the above-described and illustrated processing procedures, control procedures, specific names, and information including various data and parameters can be appropriately changed unless otherwise specified.

[Program]

Figure 25:
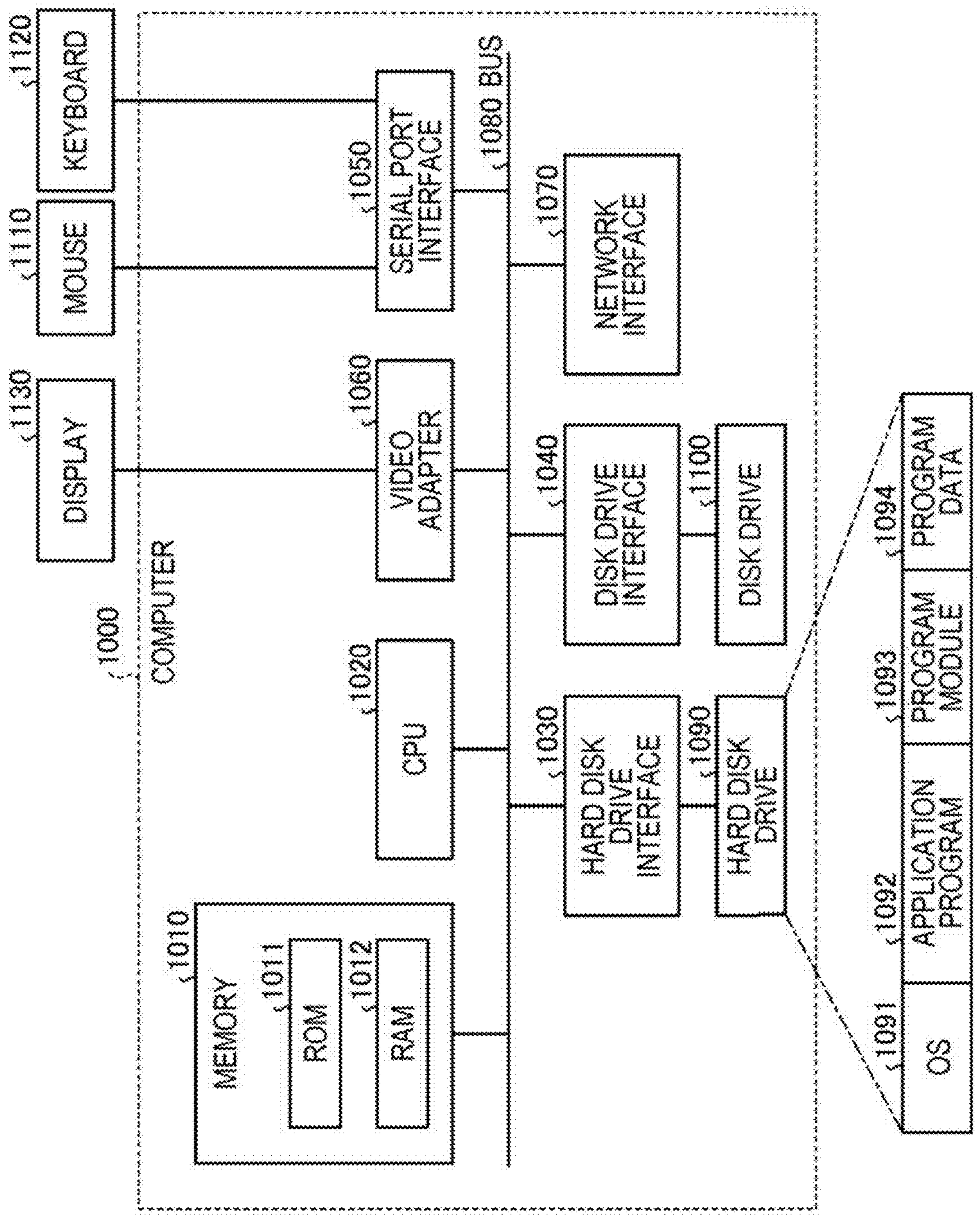
FIG. 25 is a diagram illustrating an example of a computer in which a program is executed and thus the analysis function providing device is implemented.

FIG. 25 is a diagram illustrating an example of a computer in which a program is executed and thus the analysis function providing device 10 is implemented. A computer 1000 includes a memory 1010 and a CPU 1020, for example. In addition, the computer 1000 also includes a hard disk drive interface 1030, a disk drive interface 1040, a serial port interface 1050, a video adapter 1060, and a network interface 1070. Those units are connected to each other by a bus 1080.

The memory 1010 includes ROM 1011 and RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to a mouse 1110 and a keyboard 1120, for example. The video adapter 1060 is connected to a display 1130, for example.

The hard disk drive 1090 stores an OS 1091, an application program 1092, a program module 1093, and program data 1094, for example. That is, the program that defines each of pieces of processing of the analysis function providing device 10 is implemented as the program module 1093 in which codes executable by the computer 1000 are described. The program module 1093 is stored in, for example, the hard disk drive 1090. For example, the program module 1093 for executing processing similar to the functional configurations in the analysis function providing device 10 is stored in the hard disk drive 1090. Note that the hard disk drive 1090 may be replaced with a solid state drive (SSD).

In addition, setting data used in the processing of the above-described embodiment is stored as the program data 1094, for example, in the memory 1010 or the hard disk drive 1090. Then, the CPU 1020 reads the program module 1093 and the program data 1094 stored in the memory 1010 or the hard disk drive 1090 into the RAM 1012 as necessary and executes the program module 1093 and the program data 1094.

Note that the program module 1093 and the program data 1094 are not limited to being stored in the hard disk drive 1090, and may be stored in, for example, a removable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from another computer via the network interface 1070.

Although the embodiment to which the invention made by the present inventors is applied has been described above, the present invention is not limited by the description and drawings constituting a part of the disclosure of the present invention according to the present embodiment. That is, other embodiments, examples, operation techniques, and the like made by those skilled in the art and the like based on the present embodiment are all included in the scope of the present invention.

REFERENCE SIGNS LIST

10 analysis function providing device
11 input unit
12 control unit
13 storage unit
14 output unit
121 virtual machine analysis unit
122 instruction set architecture analysis unit
123 function providing unit
131 execution trace database (DB)
132 architecture information DB
133 VM execution trace DB
1211 execution trace acquisition unit
1212 hook and tap points detection unit
1213 VM instruction boundary detection unit
1214 virtual program counter detection unit
1215 dispatcher detection unit
1221 VM execution trace acquisition unit
1222 VPC offset detection unit
1231 hook insertion unit
1232 exception handler insertion unit

The invention claimed is:

1. An analysis function providing method, comprising:

first analyzing a virtual machine of a script engine, and acquiring a hook point that is a part where an analysis code is inserted by applying a hook, and a virtual program counter that is a variable indicating an instruction of the virtual machine to be executed next;

second analyzing an instruction set architecture that is a system of instructions of the virtual machine and detecting an offset value of the virtual program counter; and providing an analysis function by applying a hook to the hook point of the script engine, wherein the applying the hook includes setting, when an exception has occurred, a value of a next virtual program counter to a value obtained by:

(i) obtaining the offset value of the virtual program counter before the exception has occurred from a virtual machine instruction before the exception has occurred, and (ii) adding the obtained offset value to a value of the virtual program counter before the exception has occurred.

2. The analysis function providing method according to claim 1, wherein the providing includes:

first inserting, into a script to be analyzed, an exception handler having a function of transferring processing to a virtual machine area when occurrence of an exception is caught, and second inserting a hook into the hook point of the script engine by using a hook handler including processing of setting the value of the next virtual program counter to the value obtained by adding the offset value of the virtual program counter to the value of the virtual program counter before the exception has occurred in the virtual machine area.

3. The analysis function providing method according to claim 2, wherein the second analyzing includes:

first acquiring a virtual machine execution trace that is an execution trace executed in the virtual machine, the virtual machine execution trace recording a pointer of an executed virtual machine instruction handler in which a virtual machine opcode is virtually allocated as an identifier, and the virtual program counter, and first detecting of acquiring an opcode of a virtual machine instruction and an offset value of the virtual program counter before and after execution of the virtual machine instruction as a set from the virtual machine execution trace, and the hook handler includes:

first processing of detecting a value of the virtual program counter before exception occurrence and determining the value of the next virtual program counter to a value obtained by adding the offset value of the virtual program counter detected to the value of the virtual program counter before the exception has occurred, and second processing of setting the value of the virtual program counter determined in the first processing to the value of the next virtual program counter and resuming execution.

4. The analysis function providing method according to claim 3, wherein the first analyzing includes:

second acquiring a plurality of execution traces while changing a condition at a time of execution, second detecting of analyzing the execution trace and detecting the hook point, third detecting of clustering the execution traces to detect a boundary of each virtual machine instruction, fourth detecting of analyzing the plurality of execution traces using differential execution analysis focusing on a number of times of reading a memory and a boundary of each virtual machine instruction detected and detecting the virtual program counter, and fifth detecting of analyzing a binary of a script engine and detecting a dispatcher based on a boundary of each virtual machine instruction detected.

5. The analysis function providing method according to claim 1, wherein the first analyzing and the second analyzing perform analysis using a test script.

6. The analysis function providing method according to claim 1, wherein the providing includes:

tracing the virtual program counter, and detecting the value of the virtual program counter before the exception has occurred from a latest entry of a trace of the virtual program counter.

7. The analysis function providing method according to claim 1, wherein the providing includes:

hooking a script application programming interface of a script to be analyzed, and calling the hooked script application programming interface as a hypervisor call to shift processing to a virtual machine area when the exception has occurred.

8. An analysis function providing device comprising:

processing circuitry configured to:

analyze a virtual machine of a script engine, and acquire a hook point that is a part where an analysis code is inserted by applying a hook, and a virtual program counter that is a variable indicating an instruction of the virtual machine to be executed next;

analyze an instruction set architecture that is a system of instructions of the virtual machine and detect an offset value of the virtual program counter; and provide an analysis function by applying a hook, to the hook point of the script engine, the hook including processing of setting, when an exception has occurred, a value of a next virtual program counter to a value obtained by:

(i) obtaining the offset value of the virtual program counter before the exception has occurred from a virtual machine instruction before the exception has occurred and (ii) adding the obtained offset value of the virtual program counter to a value of the virtual program counter before the exception has occurred based on the virtual program counter and the offset value of the virtual program counter that are architecture information obtained by analysis.

9. The analysis function providing device according to claim 8, wherein the processing circuitry is further configured to:

insert, into a script to be analyzed, an exception handler having a function of transferring processing to a virtual machine area when occurrence of an exception is caught, and insert a hook into the hook point of the script engine by using a hook handler including processing of setting the value of the next virtual program counter to the value obtained by adding the offset value of the virtual program counter to the value of the virtual program counter before the exception has occurred in the virtual machine area.

10. The analysis function providing device according to claim 9, wherein the hook handler includes:

first processing of detecting the value of the virtual program counter before the exception has occurred and determining the value of the next virtual program counter to a value obtained by adding the offset value of the virtual program counter to the value of the virtual program counter before the exception has occurred, and second processing of setting the value of the virtual program counter determined in the first processing to the value of the next virtual program counter and resuming execution.

11. The analysis function providing device according to claim 8, wherein the processing circuitry is further configured to:

trace the virtual program counter, and detect the value of the virtual program counter before the exception has occurred from a latest entry of a trace of the virtual program counter.

12. The analysis function providing device according to claim 8, wherein the processing circuitry is further configured to:

hook a script application programming interface of a script to be analyzed, and call the hooked script application programming interface as a hypervisor call to shift processing to a virtual machine area when the exception has occurred.

13. A non-transitory computer-readable recording medium storing therein an analysis function providing program that causes a computer to execute a process comprising:

first analyzing a virtual machine of a script engine, and acquiring a hook point that is a part where an analysis code is inserted by applying a hook, and a virtual program counter that is a variable indicating an instruction of the virtual machine to be executed next;

second analyzing an instruction set architecture that is a system of instructions of the virtual machine and detecting an offset value of the virtual program counter; and providing an analysis function by applying a hook, to the hook point of the script engine, the hook including processing of setting, when an exception has occurred, a value of a next virtual program counter to a value obtained by:

(i) obtaining the offset value of the virtual program counter before the exception has occurred from a virtual machine instruction before the exception has occurred and (ii) adding the obtained offset value of the virtual program counter to a value of the virtual program counter before the exception has occurred based on the virtual program counter and the offset value of the virtual program counter that are architecture information obtained by analysis.

14. The non-transitory computer-readable recording medium according to claim 13, wherein the providing includes:

inserting, into a script to be analyzed, an exception handler having a function of transferring processing to a virtual machine area when occurrence of an exception is caught, and inserting a hook into the hook point of the script engine by using a hook handler including processing of setting the value of the next virtual program counter to the value obtained by adding the offset value of the virtual program counter to the value of the virtual program counter before the exception has occurred in the virtual machine area.

15. The non-transitory computer-readable recording medium according to claim 14, wherein the hook handler includes:

first processing of detecting the value of the virtual program counter before the exception has occurred and determining the value of the next virtual program counter to a value obtained by adding the offset value of the virtual program counter to the value of the virtual program counter before the exception has occurred, and second processing of setting the value of the virtual program counter determined in the first processing to the value of the next virtual program counter and resuming execution.

16. The non-transitory computer-readable recording medium according to claim 13, wherein the providing includes:

tracing the virtual program counter, and detecting the value of the virtual program counter before the exception has occurred from a latest entry of a trace of the virtual program counter.

17. The non-transitory computer-readable recording medium according to claim 13, wherein the providing includes:

hooking a script application programming interface of a script to be analyzed, and calling the hooked script application programming interface as a hypervisor call to shift processing to a virtual machine area when the exception has occurred.

* * * * *